(12) United States Patent
Khan et al.

(10) Patent No.: US 8,527,993 B2
(45) Date of Patent: Sep. 3, 2013

(54) TASKING SYSTEM INTERFACE METHODS AND APPARATUSES FOR USE IN WIRELESS DEVICES

(75) Inventors: Raheel Khan, Tustin, CA (US); Joseph C. Chan, San Diego, CA (US); Ron Shalev, San Diego, CA (US); Naveed U. Zaman, San Jose, CA (US)

(73) Assignee: Qualcomm Incorporated, San Diego, CA (US)

( * ) Notice: Subject to any disclaimer, the term of this patent is extended or adjusted under 35 U.S.C. 154(b) by 301 days.

(21) Appl. No.: 12/896,636

(22) Filed: Oct. 1, 2010

(65) Prior Publication Data

US 2011/0296415 A1  Dec. 1, 2011

Related U.S. Application Data

(60) Provisional application No. 61/350,421, filed on Jun. 1, 2010.

(51) Int. Cl.
*G06F 9/45* (2006.01)
*H04B 1/38* (2006.01)

(52) U.S. Cl.
USPC ............................ 718/100; 718/104; 375/220

(58) Field of Classification Search
None
See application file for complete search history.

(56) References Cited

U.S. PATENT DOCUMENTS

| | | | |
|---|---|---|---|
| 6,766,516 B1 * | 7/2004 | Draganic | 718/102 |
| 7,478,390 B2 * | 1/2009 | Brokenshire et al. | 718/100 |
| 2002/0026557 A1 | 2/2002 | Takasugi | |
| 2004/0162954 A1 | 8/2004 | Chauvel | |
| 2008/0066066 A1 | 3/2008 | MacPherson | |
| 2009/0113432 A1 * | 4/2009 | Singh et al. | 718/102 |
| 2010/0211954 A1 | 8/2010 | Bauer et al. | |
| 2011/0296078 A1 | 12/2011 | Khan et al. | |
| 2011/0296120 A1 | 12/2011 | Khan | |

FOREIGN PATENT DOCUMENTS

| | | |
|---|---|---|
| EP | 1819104 A1 | 8/2007 |
| EP | 1936630 A1 | 6/2008 |
| WO | WO2007013381 A1 | 2/2007 |
| WO | WO2007135602 A1 | 11/2007 |
| WO | WO2010105889 A1 | 9/2010 |

OTHER PUBLICATIONS

International Search Report and Written Opinion—PCT/US2011/054432—ISA/EPO—Jan. 2, 2012.
Data Width and Format Conversion Subsystem for a Graphics Coprocessor, IBM Technical Disclosure Bulletin, International Business Machines Corp. (Thornwood), US, vol. 33, No. 3A, Aug. 1, 1990, pp. 145-152, XP000123881, ISSN: 0018-8689.

* cited by examiner

*Primary Examiner* — Kenneth Tang
(74) *Attorney, Agent, or Firm* — Eric Ho

(57) ABSTRACT

Techniques are provided which may be implemented in various methods and/or apparatuses that to provide a tasking system buffer interface capability to interface with a plurality of shared processes/engines.

40 Claims, 27 Drawing Sheets

US 8,527,993 B2

TASKING SYSTEM INTERFACE METHODS AND APPARATUSES FOR USE IN WIRELESS DEVICES

This patent application claims benefit of and priority to U.S. Provisional Patent Application 61/350,421, filed Jun. 1, 2010, Titled, "Methods And Apparatuses For Use In Wireless Devices", and which is hereby incorporated by reference.

RELATED PATENT APPLICATIONS

This patent application is related to co-pending U.S. Non-provisional patent application Ser. No. 12/896,622, filed Oct. 1, 2010, Titled, "Virtual Buffer Interface Methods And Apparatuses For Use In Wireless Devices", and which is hereby incorporated by reference.

This patent application is related to co-pending U.S. Non-provisional patent application Ser. No. 12/896,646, filed Oct. 1, 2010, Titled, "Memory Pool Interface Methods And Apparatuses", and which is hereby incorporated by reference.

BACKGROUND

1. Field

The subject matter disclosed herein relates to electronic devices, and more particularly to methods and apparatuses for use in a wireless modem and/or other like capability to provide a virtual buffer interface.

2. Information

Wireless communication systems are fast becoming one of the most prevalent technologies in the digital information arena. Satellite and cellular telephone services and other like wireless communication networks may already span the entire globe. Additionally, new wireless systems (e.g., networks) of various types and sizes are added each day to provide connectivity among a plethora of devices, both fixed and mobile. Many of these wireless systems are coupled together through other communication systems and resources to promote even more communication and sharing of information.

Another popular and increasingly important wireless technology includes navigation systems and in particular satellite positioning systems (SPS) such as, for example, the global positioning system (GPS) and other like Global Navigation Satellite Systems (GNSS), regional navigation systems, and/or other augmented navigation systems. SPS enabled devices, for example, may receive wireless SPS signals that are transmitted by orbiting satellites of a GNSS and/or other ground based transmitting devices. The received SPS signals may, for example, be processed to determine a global time, a range or pseudorange, an approximate or accurate geographical location, altitude, and/or speed of the SPS enabled device. Consequently, various position and/or velocity estimation processes may be supported, at least in part, using an SPS enabled device.

Many devices, and in a particular example portable electronic devices, may be capable of performing a variety of services including various communication, navigation and/or other like or related data processing services. Accordingly, it may be useful to provide techniques that allow circuitry and/or other data processing capabilities to be shared in some manner. For example, it may be useful to reduce duplicative circuitry and/or otherwise seek to manufacture and/or operate such devices in a more efficient manner.

SUMMARY

In accordance with certain aspects, techniques are provided which may be implemented in various methods and/or apparatuses to provide an interface to a shared memory pool and/or other like data storage mechanism. In certain example implementations, a virtual buffer interface may be provided. In certain example implementations, a virtual buffer interface may be provided as part of the wireless modem to interface a plurality of client processes seeking to read and/or write data to a shared memory pool.

In accordance with still other aspects, certain example wireless modem and/or other like capability methods and apparatuses are illustrated which comprises one or more example virtual buffer interface, task queue interface, and/or memory pool interface methods and apparatuses.

It should be understood, however, that these are merely example implementations according certain implementations, and that claimed subject matter is not limited to such example implementations.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Example Device and Environment Implementations:

Many devices, and in a particular example portable electronic devices, may be capable of performing a variety of services including various communication, navigation and/or other like or related data processing services. Accordingly, some devices may comprise duplicative circuitry such as a dedicated memory and/or circuitry associated therewith.

In accordance with certain aspects, techniques are provided which may be implemented in various methods and/or apparatuses to provide an interface to a shared memory pool and/or other like data storage mechanism. In certain example implementations, a virtual buffer interface may be provided, e.g., as part of the wireless modem. Here, for example, a wireless modem may operatively interface a plurality of client processes seeking to read and/or write data to a shared memory pool. In certain example implementations a wireless modem and/or other like capability may comprise one or more of a virtual buffer interface, a task queue interface, and/or memory pool interface.

Figure 1A:
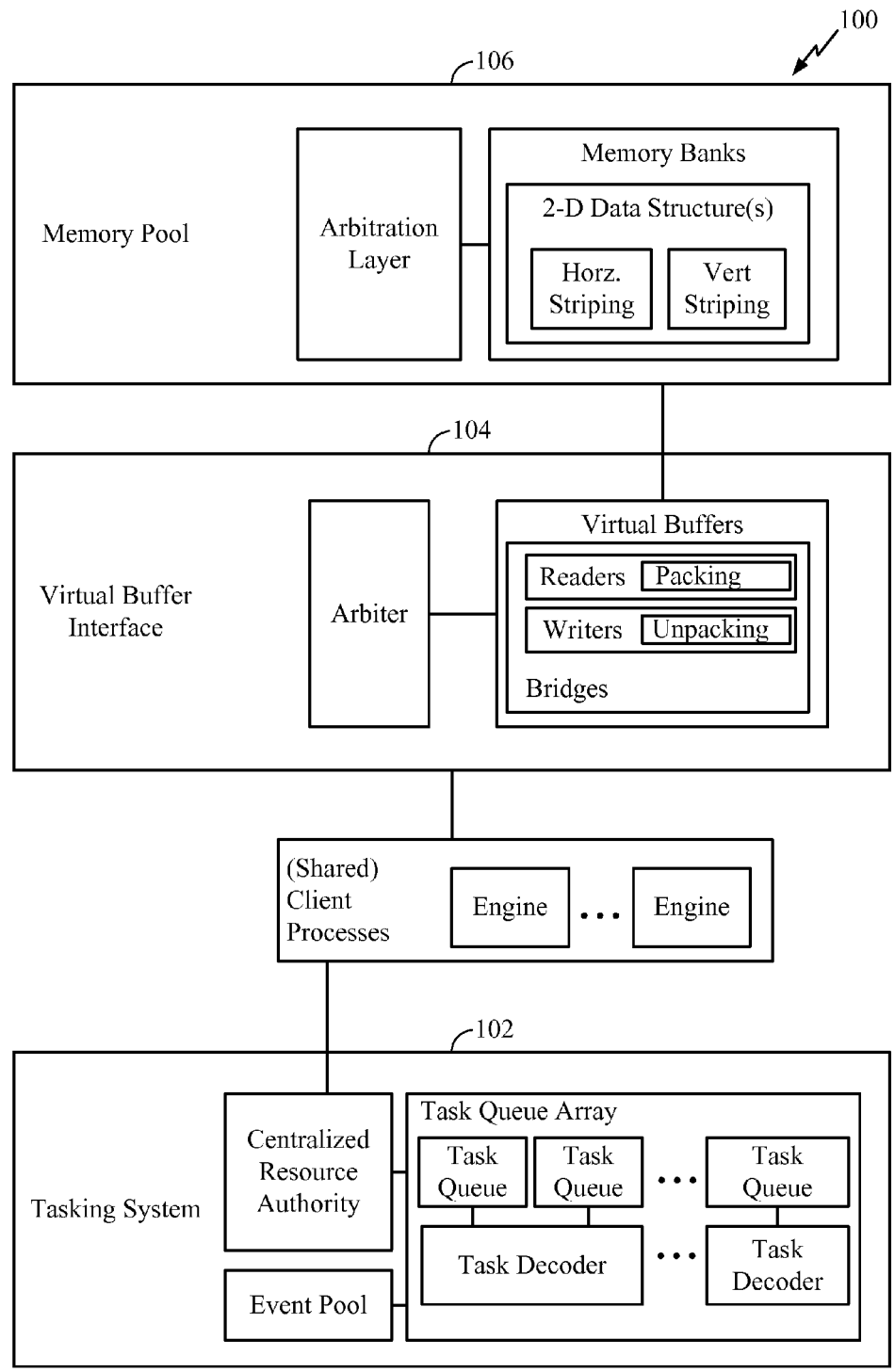
FIG. 1A is a schematic block diagram illustrating an example apparatus comprising a virtual buffer interface capability, operatively arranged for use with a task queue interface capability, and a memory pool interface capability, in accordance with an implementation.

Example Device and Environment Implementations:

Attention is drawn to FIG. 1A, which presents a block diagram illustrating an example apparatus 100 comprising a virtual buffer interface capability 104, operatively arranged for use with a task queue interface capability 102, and a memory pool interface capability 106. Particular interface capabilities are described in greater detail in subsequent sections herein. It should be kept in mind that while several example implementations are provided herein, claimed subject matter limited to these examples.

With regard to apparatus 100, for example, task queue interface capability 102 may be coupled to one or more processors and/or other like circuitry (not shown) which may generate and/or otherwise identify a plurality of tasks (e.g., data processing, communication, etc.) associated with a plurality of client processes (e.g., engines). Task queue interface capability 102 may, for example, control access to and/or use of all or some of client processes in some manner depending on a particular implementation. For example, in certain implementations one or more client processes may be shared via the use of a task queue array, a centralized resource authority, and an event pool.

As illustrated further in FIG. 1A, as part of their assigned task or capability (e.g., as identified via task queue interface capability 102) some or all of the client processes may need to access memory. For example, a client process may need to read and/or write data to memory. In this example implementation, a memory pool interface capability 106 may be provided for access by all or a portion of the client processes.

To provide for and/or otherwise control access to such a memory pool, virtual buffer interface capability 104 may be provided. For example, as described in greater detail below, virtual buffer interface capability 104 may handle read and write requests from the various client processes. Here, for example, some of the client processes may be capable of reading and writing and/or otherwise handling data in different discrete sizes and/or formats. As such, for example, virtual buffer interface capability 104 may be enabled to perform certain processes which may permit controlled sharing of data stored in memory in an efficient manner, and which may account for different data formats/needs of the various client engines. For example, as presented in certain example implementations, one or more virtual bridges may be provided to pack or unpack data, and/or an arbiter may be provided to control access to shared data.

Additionally, in certain example implementations, memory pool interface capability 106 may include a plurality of memory banks across which data structures may be stored in an efficient manner and to provide certain access capabilities for client processes (e.g., via virtual buffer interface capability 104). For example, memory pool interface capability 106 may provide a two-dimensional (2-D) data structure having certain types of data striping (e.g., horizontal and/or vertical) which may support certain client process needs. In certain example implementations, memory pool interface capability 106 may also comprise an arbitration layer which may further control certain aspects regarding the memory pool.

Figure 1B:
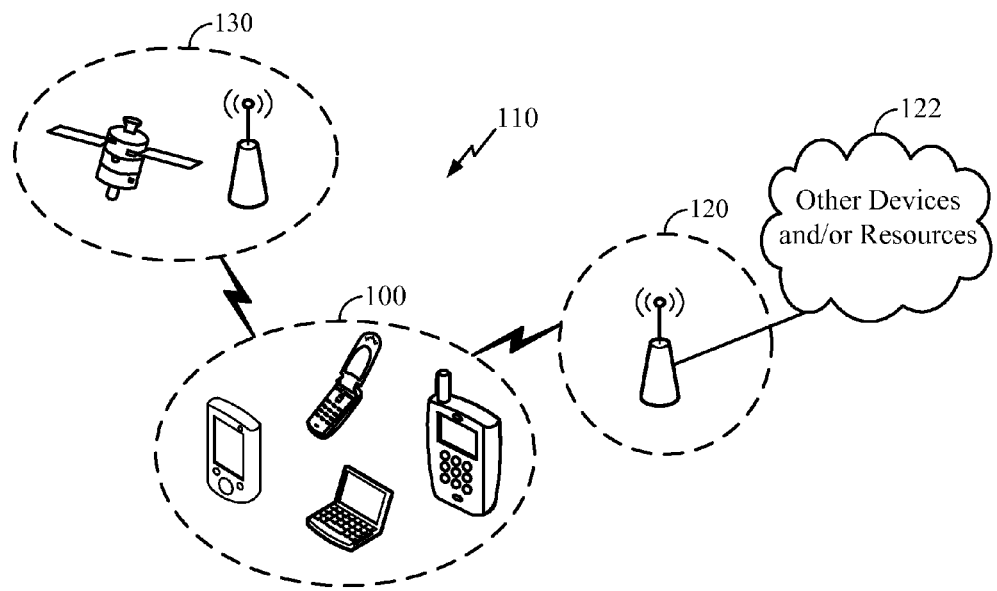
FIG. 1B is a schematic a block diagram illustrating an example wireless signaling environment within which an apparatus may operate, for example, to send and/or receive wireless signals associated with one or more wireless communication networks and/or one or more wireless navigation systems, in accordance with an implementation.

Reference is made next to FIG. 1B, which presents a block diagram illustrating an example wireless signaling environment 110 within which apparatus 100 may operate, for example, to transmit and/or receive wireless signals associated with one or more wireless communication networks 120 and/or one or more wireless navigation systems 130. Here, for example, apparatus 100 may comprise a portable electronic device capable of supporting data processing associated with received and/or transmitted information relating to one or more wireless communication networks 120, one or more wireless navigation systems 130, one or more other devices/ services and/or resources 122, and/or other operations/capabilities associated with apparatus 100.

Figure 1C:
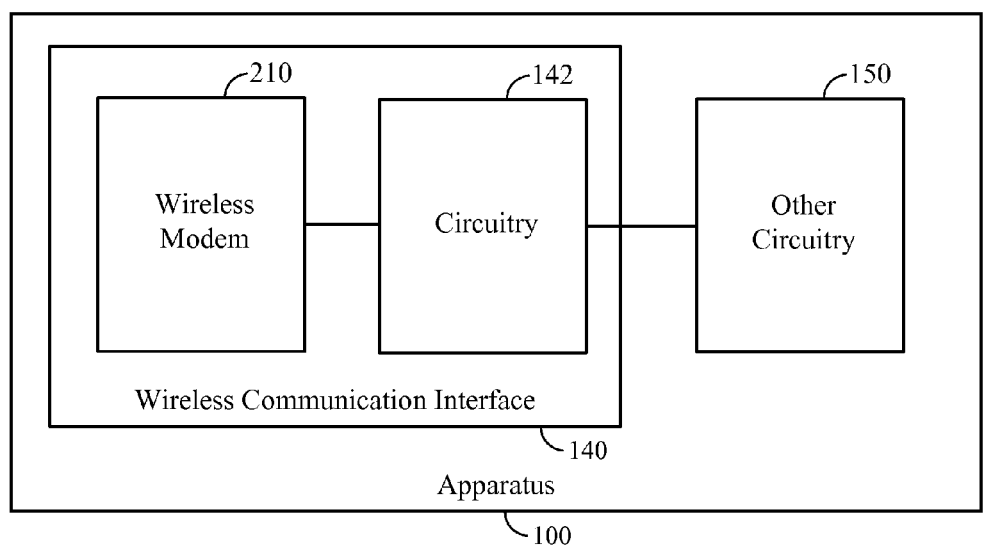
FIG. 1C is a schematic a block diagram illustrating an example apparatus having a wireless communication interface comprising a wireless modem, in accordance with an implementation.

For Example, FIG. 1C illustrates an example apparatus 100 having a wireless communication interface 140 comprising a wireless modem 210 and (optional) circuitry 142. Here, for example, wireless communication interface 140 may be coupled to other circuitry 150 within device 100. For example, circuitry 142 and/or other circuitry 150 may include one or more processing units, additional memory, a user interface, one or more wireless interfaces (e.g., transceivers, receiver, transmitter, etc.), and/or other like hardware and/or hardware/software implemented capabilities.

While the example implementations above and below, present apparatus 100 and portions thereof as being of particular usefulness in a wireless device and/or wireless modem implementation, it should be clear to those skilled in the art that many of the techniques provided herein may be employed in other implementations. For example, certain techniques presented with regard to virtual buffer interface capability 104 and/or memory pool interface capability 106 may be implemented in other computing and/or communication devices that may benefit from and/or need to share memory. For example, certain techniques presented with regard to task queue interface capability 102 may be implemented in other computing and/or communication devices that may benefit from and/or need to task and/or share computing processes, engines, circuits, etc.

Example Virtual Buffer Interface Methods and Apparatuses:

Co-pending U.S. Non-provisional patent application Ser. No. 12/896,622, filed Oct. 1, 2010, Titled, "Virtual Buffer Interface Methods And Apparatuses For Use In Wireless Devices", presents subject matter directed towards aspects relating to a tasking system interface capability some examples of which are described herein.

Figure 2:
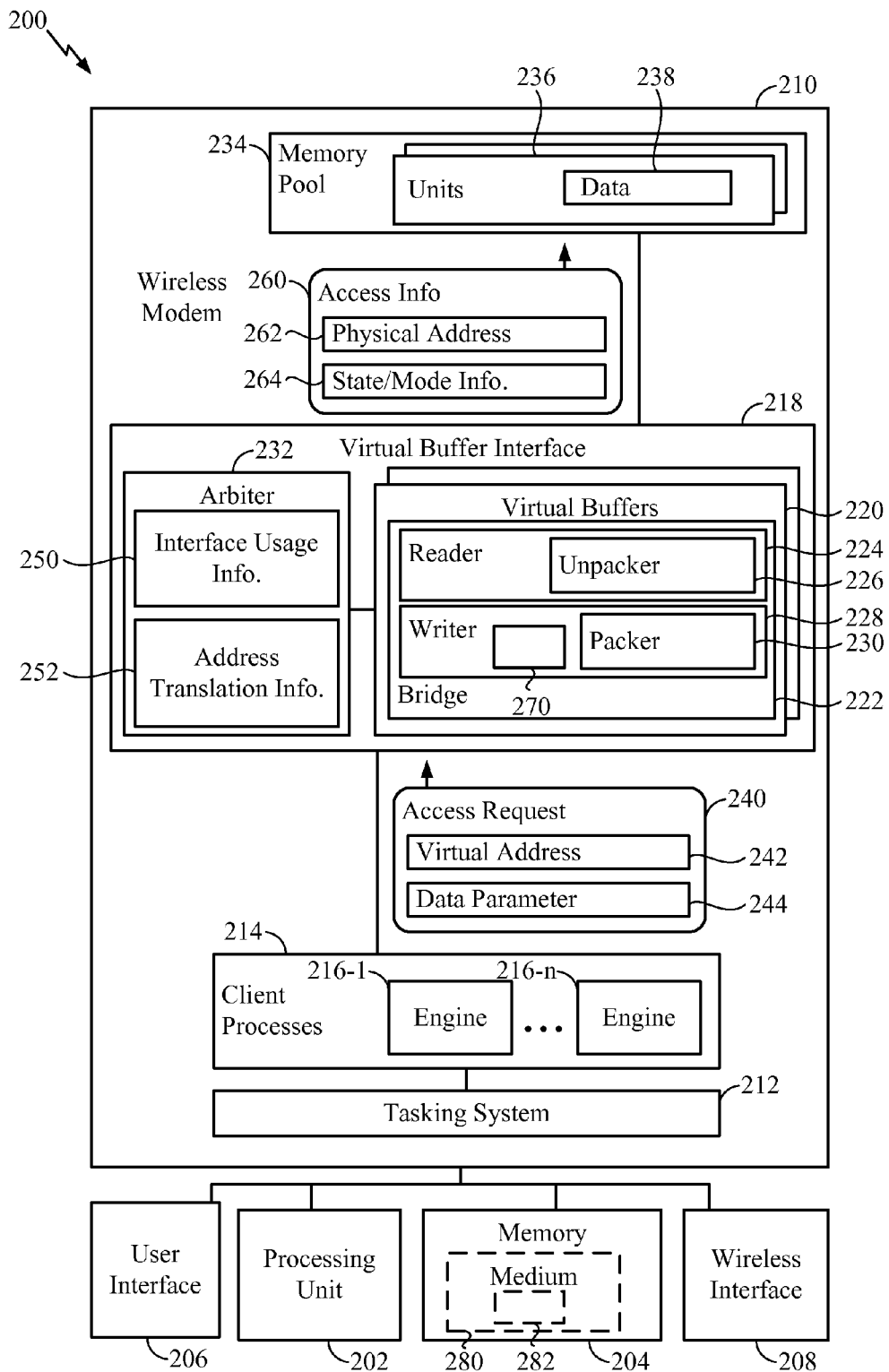
FIG. 2 is a schematic a block diagram illustrating an example wireless modem apparatus comprising a virtual buffer interface capability, in accordance with an implementation.

FIG. 2 illustrates an example implementation of an apparatus 200 that may be enabled to perform all or part of a process 300 (FIG. 3) which may include obtaining at least one memory access request 240 from at least one of a plurality of client processes 214, wherein the memory access request 240 may specify at least one virtual address 242 associated with at least one of a plurality of virtual buffers 220 related to an operatively segmented memory pool 234. Process 300 may further include generating at least one (e.g., physical) address 262 associated with the memory pool 234 based, at least in part, on at least one virtual address 242 using at least one of a plurality of interfaces 218. Here, for example, at least one of the plurality of interfaces 218 may be capable of operatively serving at least one of a plurality of client processes 214. Process 300 may further include accessing at least a portion of at least one of the virtual buffers 220 operatively associated with at least one physical address 262. Here, for example, such accessing may comprise performing, based at least in part on a word bit width associated with at least one of the plurality of client processes 214, at least one of: a data packing operation (230) as part of a write operation; and/or a data unpacking operation (226) as part of a read operation.

In certain example implementations, accessible memory may comprise a memory pool 234 having a plurality of separately controllable memory units 236. As such, in certain example implementations, a process may further comprise selectively altering a power state and/or a mode (264) of at least one of the plurality of separately controllable memory units 236.

In certain example implementations, process 300 may further include determining at least one interface usage parameter 250 associated with at least one of the plurality of separately controllable memory units 236, and selectively altering a power state and/or the mode (264) of at least one of the plurality of separately controllable memory units 236 based, at least in part, on at least one interface usage parameter 250.

In certain example implementations, at least two of the plurality of virtual buffers 220 may be operatively configured for use by at least two different client processes 214, and/or to store accessible data in at least two different word bit widths. Here, for example, at least two different word bit widths may correspond to at least two different client processes 214.

In certain example implementations, a process may further include associating at least one virtual address 242 with at least one data parameter 244. For example, at least one data parameter 244 may identify or otherwise relate to at least one of: a desired word bit width associated with at least one of the plurality of client processes 214; a desired bandwidth associated with at least one of the plurality of client processes 214; and/or a desired data access type associated with at least one of the plurality of client processes 214. In certain example implementations, a data access type may identify a sequential data access or a non-sequential data access.

In certain example implementations, a least one other of the plurality of interfaces 218 may be configured for use by a single client process 214 (e.g., engine 216).

In certain example implementations, a process may further include generating at least one physical address 262 associated with the memory, at least in part, by mapping a virtual address 242 to a corresponding physical address based, at least in part, on address translation information 252.

In certain example implementations, process 300 may include, as part of a write operation, performing a read-modify-write operation. In certain example implementations, process 300 may include storing data 238 in local cache memory 270 associated with at least one of the plurality of interfaces 218.

Thus, as shown, apparatus 200 may, for example, include memory 234, an arbiter 232 (e.g., logic) to operatively segment at least a portion of accessible memory into a plurality of virtual buffers 220, and a plurality of (virtual buffer) interfaces 218 coupled to memory 234 and arbiter 232, wherein at least one of the plurality of interfaces 218 is configured to provide an interface to accessible memory for a plurality of client processes 214 by generating at least one physical address 262 associated with the memory based, at least in part, on at least one virtual address 242 as identified by the client process. Such an apparatus may also access at least a portion of accessible memory associated with at least one of the virtual buffers 220 operatively associated with at least one physical address 262, and based, at least in part, on a word bit width associated with the applicable client process performing at least one of: a data packing operation (230), and/or a data unpacking operation (226).

In certain example implementations, an apparatus 200 may comprise a wireless modem 210 and/or otherwise be provided as part of apparatus 100 (FIG. 1A-C). In certain example implementations, an apparatus 200 include one or more interfaces to operatively couple one or more processing units 202, memory 204, a user interface 206, a wireless interface 208, a computer-readable medium 280 having computer-implementable instructions 282 stored thereon. In certain example implementations, at least one wireless interface may support at least two air interface modes having different data storage formats.

Figure 3:
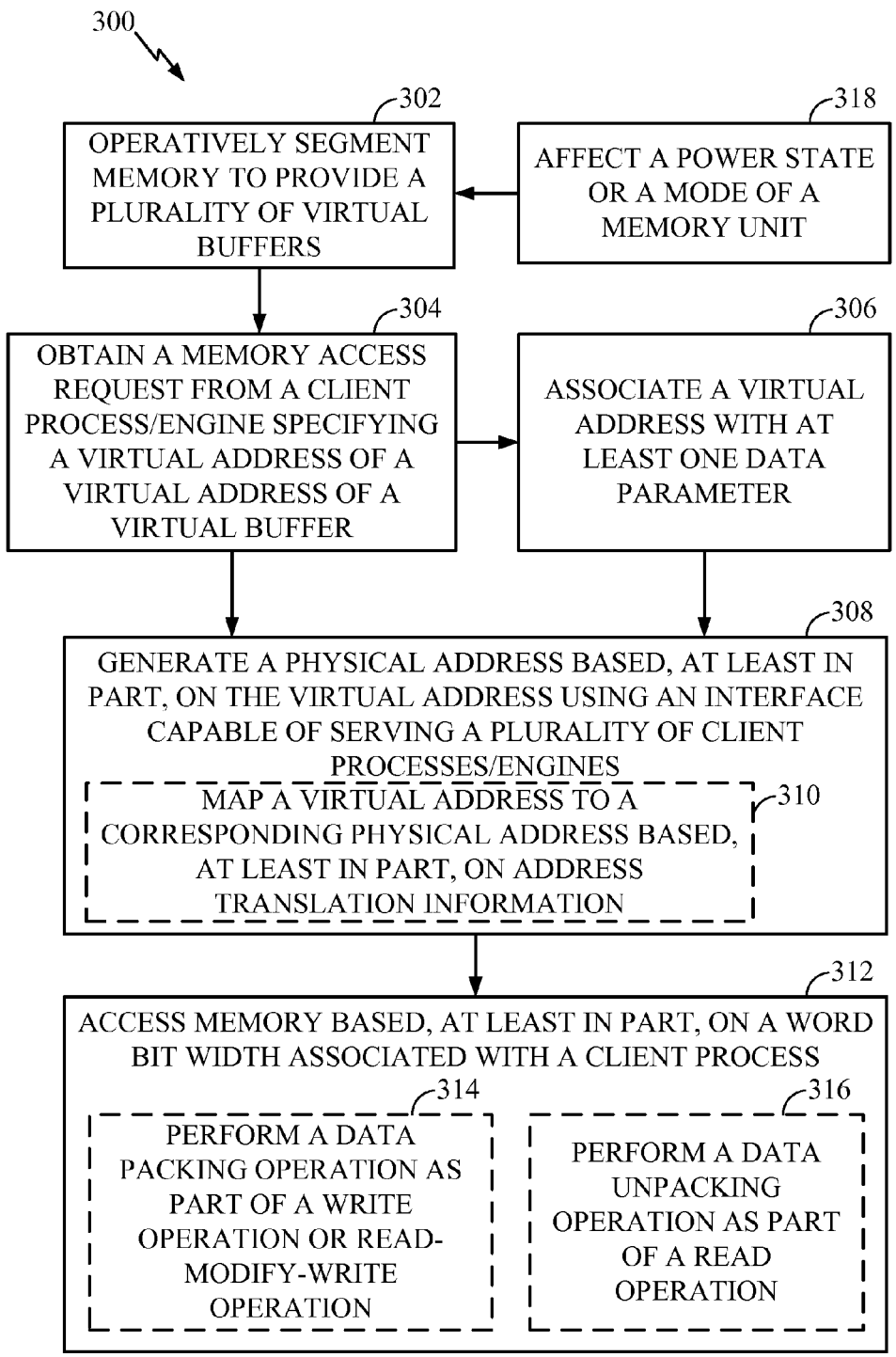
FIG. 3 is a flow-diagram illustrating an example process for use in providing a virtual buffer interface capability, in accordance with an implementation.

In certain example implementations, process 300 as illustrated in FIG. 3 may include, at block 302, operatively segmenting at least a portion of a memory into a plurality of virtually addressable buffers. At block 304, process 300 may include obtaining at least one memory access request from at least one of a plurality of client processes, the memory access request specifying at least one virtual address associated with at least one of the plurality of virtual buffers. At block 308, process 300 may include generating at least one physical address associated with the memory based, at least in part, on at least one virtual address. For example, at block 310, a virtual address may be mapped to a physical address based, at least in part, on address translation information (e.g., provided by an arbiter 232 (FIG. 2), and/or the like). At block 312, process 300 may include accessing at least a portion of at least one of the virtual buffers (e.g., memory operatively associated with at least one physical address. At block 314, process 300 may include performing a data packing operation as part of a write operation based, at least in part, on a word bit width associated with at least one of the plurality of client processes. At block 316, process 300 may include performing a data unpacking operation as part of a read operation based, at least in part, on the word bit width associated with at least one of the plurality of client processes.

In certain example implementations, an article of manufacture may be provided which comprises a computer-readable medium 280 having stored thereon computer-implementable instructions 282 executable by at least one processing unit 202 and/or other like processing capability operatively associated with and/or included within apparatus 200 (see FIG. 2). The computer-implementable instructions 282 may enable at least a portion of the functionality of process 300, for example.

Thus, by way of example, given the examples of virtual buffer interface 218 and/or process 300, an apparatus may be provided which comprises circuitry such as memory and logic (e.g., programmable, firmware, discrete, etc.). The logic circuitry may serve as an arbiter to operatively segment at least a portion of accessible physical memory into a plurality of virtual buffers, for example. The logic circuitry may comprise a plurality of virtual buffers which may be coupled to accessible memory and the arbiter logic circuitry. The plurality of virtual buffers may, for example, be configured to provide an interface to the memory for a plurality of client processes (e.g., functions, engines, etc.) by generating at least one physical address associated with the memory based, at least in part, on at least one virtual address as identified by at least one of the plurality of client processes. Here, for example, a virtual buffer may perform a data packing operation and/or a data unpacking operation based, at least in part, on a word bit width associated with the at least one of the plurality of client processes.

In certain example implementations, at least two of the plurality of virtual buffers may be used by (or serve) at least two different client processes which operate with data in different word bit widths.

In certain example implementations, at least one virtual address may be obtained in a memory access request and associated with at least one data parameter. Here, for example, a data parameter may identify a desired word bit width associated with the at least one of the plurality of client processes, a desired bandwidth associated with the at least one of the plurality of client processes, a desired data access type associated with the at least one of the plurality of client processes, and/or the like. In certain example implementations, a data access type may identify a desire for sequential data access or non-sequential data access.

In certain example implementations, a physical address associated with accessible memory may be generated, at least in part, by mapping a virtual address to a corresponding physical address based, at least in part, on address translation information established/maintained by the arbiter logic circuitry.

In certain example implementations, a virtual buffer may comprise a reader interface, a writer interface, a bridge interface, and/or the like. Some example implementations are described in greater detail below. In certain situations, it may be beneficial for a writer interface and/or a bridge interface to access at least a portion of at least one of the virtual buffers using a read-modify-write operation, and/or for a virtual buffer to comprise and/or access a local cache memory.

As presented by the example implementations herein, a virtual buffer interface capability may comprise readers, writers, sources, sinks, queues and bridges, and/or a combination thereof and/or the like.

Thus, for example, a writer client process may, for example, use one or more writer interfaces to deposit data to an allocated virtual buffer in a serial fashion. By way of example, a writer client may not explicitly provide a physical address to the virtual buffer interface capability with each quantum of data that it deposits into a virtual buffer. Instead, certain example writer interfaces may increment one or more (internal) write pointers according to some specified virtualization scheme. A writer interface may, for example, comprise internal buffers that are used to pack data before it may be written to a physical memory. A writer interface may be configured for circular-buffer operation, for example.

A reader client may, for example, use one or more reader Interfaces to access data from an allocated virtual buffer according a specified virtualization scheme. Certain example a reader client may also not provide explicit virtual addresses to the virtual buffer interface capability. Instead, a reader interface may increment one or more (internal) read pointers according to some specified virtualization scheme. Certain reader interfaces may comprise (internal) look-ahead buffers to facilitate efficient access to physical memory, for example. Certain example reader interfaces may also be configured for circular-buffer operation.

As reader and writer interfaces may access the same region in physical memory, for example, clients of these interfaces may coordinate or have coordinated access to ensure proper operation.

Source and sink interfaces may, for example, be provided as a type of reader and writer interfaces, respectively, with one possible difference being in initiation of a data flow. Thus, certain example source interfaces may be similar to reader interfaces but allow source interfaces to access data from allocated virtual buffer(s) according a specified virtualization scheme and to push such data to client processes/engines. Certain example source clients may also not provide an explicit virtual address to the virtual buffer interface capability. For example, certain sources may increment (internal) one or more read pointers according to some specified virtualization scheme, comprise internal look-ahead buffers to facilitate efficient access to physical memory, and/or may be configured for circular-buffer operation. In an analogous manner, certain example sinks may initiate data transfer from one or more client interfaces whereas certain example writers may accept data transfers initiated by client processes/engines.

In certain example implementations, one or more bridge Interfaces may be used to access data stored in virtual buffers using explicit virtual addresses (and/or indices). Virtual buffers may, for example, be configured as two-dimensional arrays of arbitrary dimensions. A bridge Interface may, for example, store two-dimensional arrays in row-major format and provide packing and/or unpacking of data as/if needed. These are but a few examples as it should be clear that other example client types, including Queues may also be provided.

As mentioned previously, an example virtual buffer interface capability may support data of varying bit-widths. While an instance of an interface may be generally expected to support a specific bit-width, certain example interface (e.g., bridges) may support a plurality of bit-widths and/or variable bit-widths.

By way of example, a virtual buffer interface capability may provide a mechanism for packing, unpacking and addressing data that may be 6-, 8-, 12-, 16-, 20-, 24-, 32-bits wide, etc. Here, for example, let us assume that a data bit-width may be set to W bits, and that certain example memory allocations may be broken into blocks of B data-units with a block comprising L lines (128 bits) of data. A virtual address may, for example, be translated into physical memory address as follows: Physical Address=(Virtual Address/B)*L.

Certain example values of B, N, and L may be:

TABLE 1

Example Parameters used for packing and unpacking data in memories

| | W (data bit-width) | | | | | | |
|---|---|---|---|---|---|---|---|
| | 6 | 8 | 12 | 16 | 20 | 24 | 32 |
| B (block size) | 64 | 16 | 32 | 8 | 32 | 16 | 4 |
| L (number of lines) | 3 | 1 | 3 | 1 | 5 | 3 | 1 |

Here, for example, an index of data within the block may be found as follows: Index=(Virtual Address) mod B. For example, for 8-bit data, an address translation simplifies to a divide by 16 and a modulo 16 operation. In case of 20-bit data the relationships become: Physical Address=(Virtual Address/16)*5 and Index=(Virtual Address) mod 32.

Thus, certain example interfaces may implement a packing and/or an unpacking scheme to access data from their associated virtual buffers. A packing scheme may, for example, be a function of the bit-width Q of the data-unit used by an interface. Certain example and/or all readers may deliver an integer number of data-units to their clients in a single clock cycle (e.g., conditioned on the availability of data, of course). Furthermore, certain example readers and sources may differ in the details of their data transfer mechanism.

With this in mind, attention is drawn next to FIG. 8A-H, which present block diagrams illustrating some example interfaces that may be implemented in a virtual buffer interface capability to couple certain client processes with a memory pool.

Figure 8A:
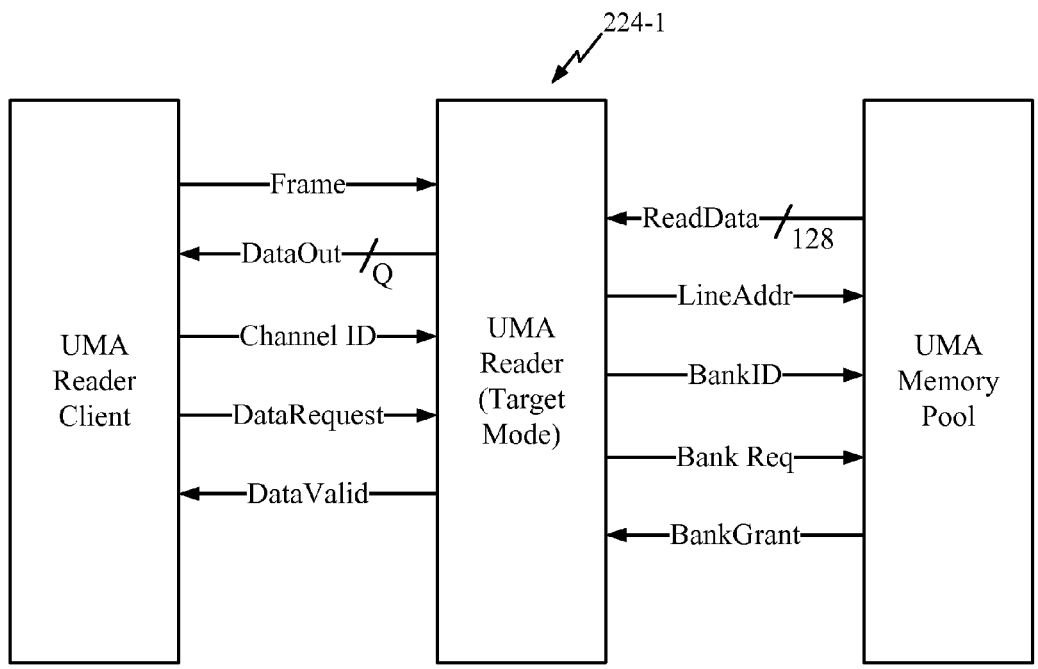
FIG. 8A-H are schematic block diagrams illustrating some example interfaces that may be implemented in a virtual buffer interface capability to interface certain client processes with a memory pool capability, in accordance with some implementations.
Figure 8B:
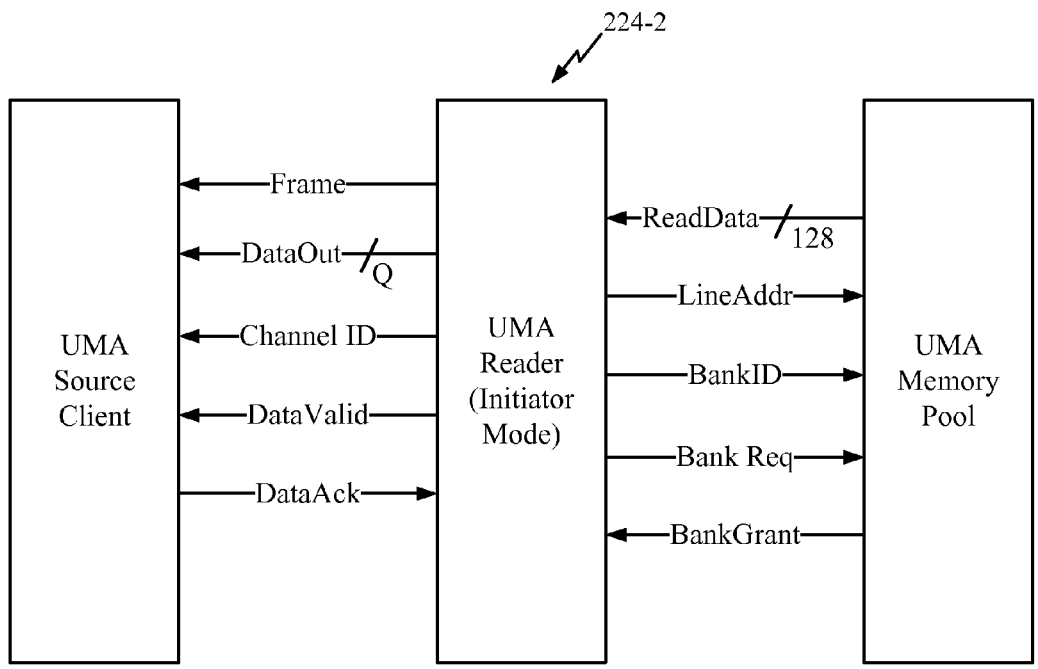

FIG. 8A and FIG. 8B graphically present some example readers 224-1 and 224-2 that operate in a target mode and in an initiator mode, respectively. Reader 224-1, for example, may provide data as requested by a client process. For example, a read cycle may be initiated in response to a client asserting a 'DataRequest' signal, and may be completed in response to a reader asserting a 'DataValid' signal.

In contrast, reader 224-2 may act as a source in that it may attempt to push or otherwise provide data to a client process (e.g., whenever data may be available) by asserting 'DataValid'. Here, for example, a read transaction may be completed in response to a client process asserting a 'DataAck' signal. Thus, a client process may insert wait-states (and/or employ other like techniques) by keeping the 'DataAck' line de-asserted. A 'ChannelID' signal may be used to implement a multi-channel interface, for example. As such, certain example sources and readers may differ in usage of such a signal. More details regarding some example multichannel interfaces are presented in subsequent sections.

In certain example implementations, quaternary readers and/or sources may be provided. For example, to service bandwidth-intensive applications (e.g., client processes/engines, etc.) non-unary readers and/or sources may be useful and/or necessary. Non-unary interfaces may, for example, transfer more than a unitary (one) data-unit across an interface in a single clock cycle. Certain example virtual buffer interfaces may therefore support unary, binary, quaternary, and/or the like capable interfaces. Note that, in certain example implementations, quaternary interfaces may use up to 100% of a memory bandwidth from a physical memory bank.

Like other example interfaces, certain example quaternary readers and/or sources may throttle a flow of data to their client processes. In this way, while burst transfers of four data-units per cycle, for example, may be supported by quaternary interfaces, an average throughput may be significantly less than a burst rate. However, this may be one mechanism that supports interfaces with throughput requires in excess of one data-unit per clock cycle.

Figure 8C:
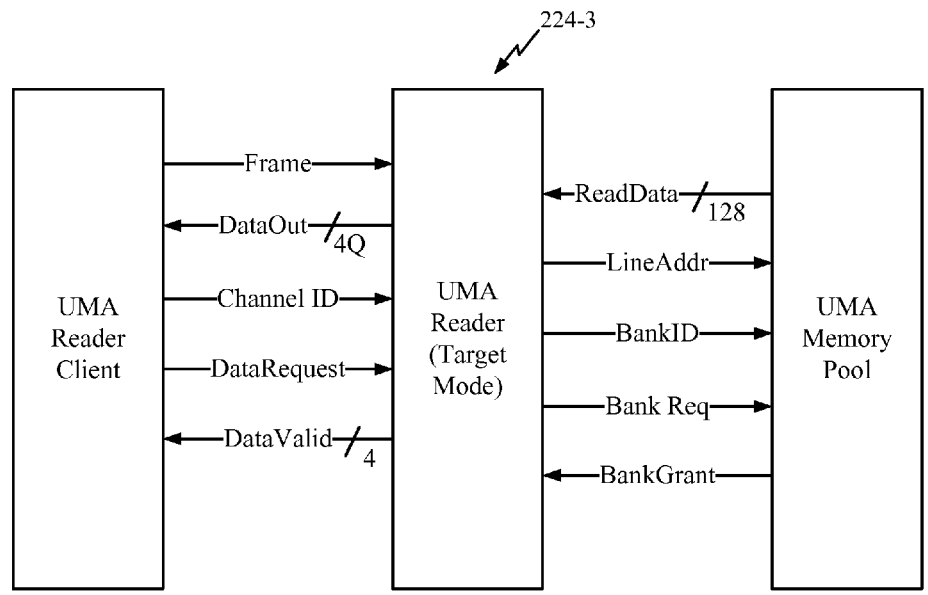
Figure 8D:
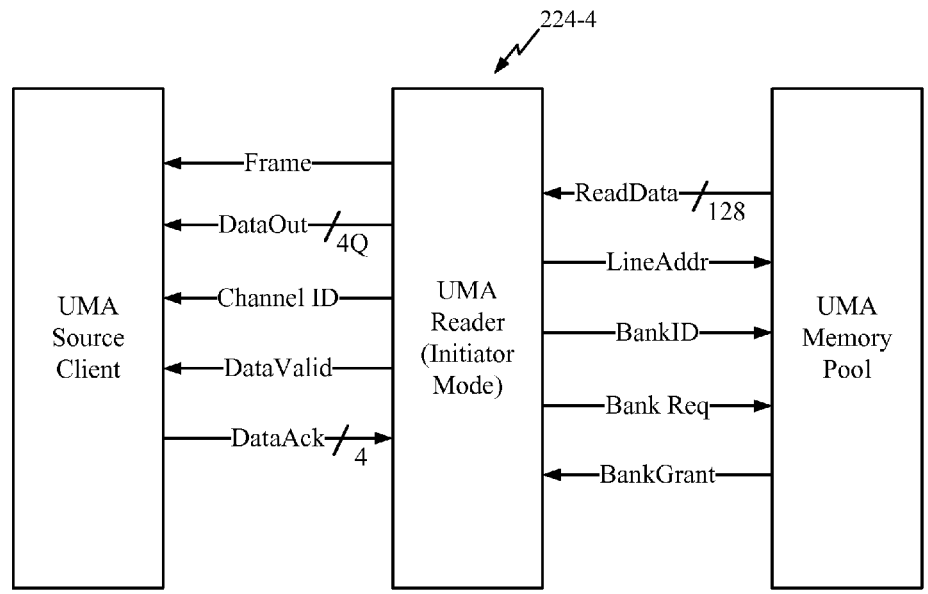

Certain example quaternary readers/sources may be identical to their unary versions except that such example quaternary interfaces may feature a 4-bit wide valid signal which may indicate a number and/or location of data-units transferred across a client interface. One or more quaternary interfaces may, for example, transfer four data-units per cycle for all cycles except possibly a last one. The last transfer may, for example, be least significant bit (lsb)-justified, with all unused bits set to zero and valid signals corresponding to valid data-samples may be asserted. Thus, in certain example implementations, the following combinations of valid signals may be considered proper for quaternary interfaces: '0001', '0011', '0111' and '1111'. FIGS. 8C and D graphically present some example quaternary readers 224-3 and 224-4 that operate in a target mode and in an initiator mode, respectively.

Figure 8E:
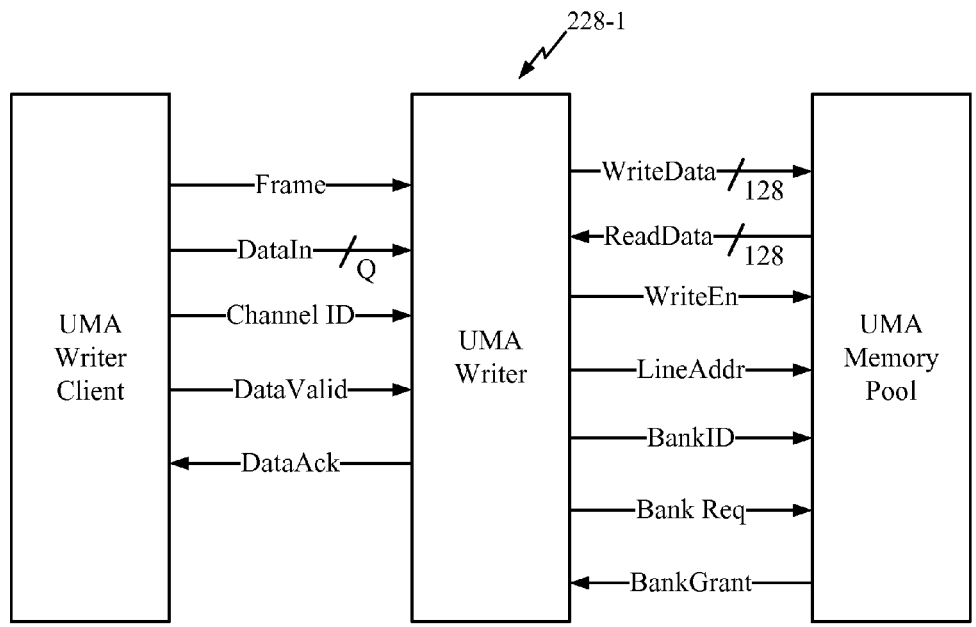
Figure 8F:
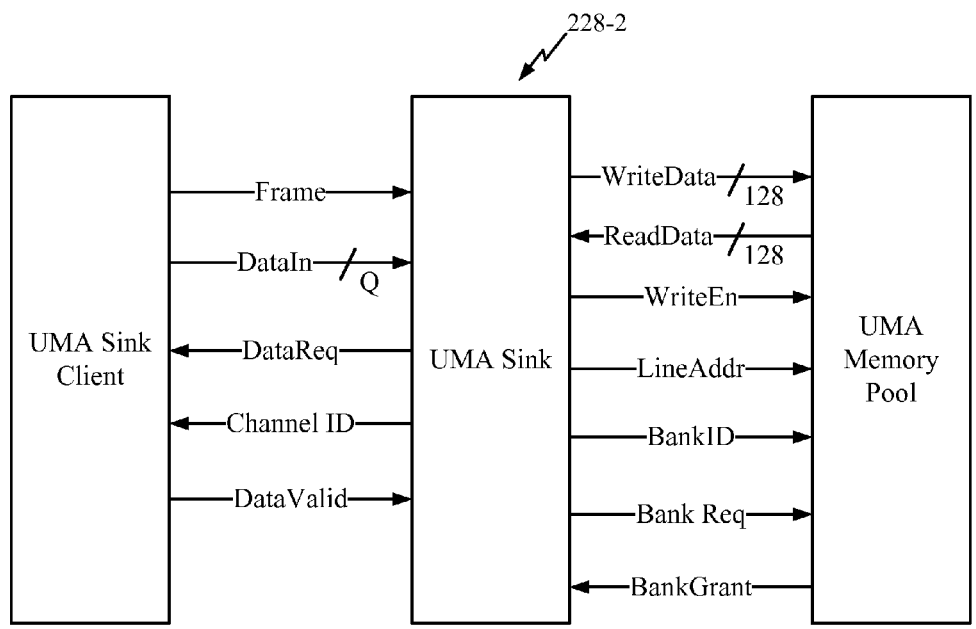

FIGS. 8E and F graphically present some example writers 228-1 and 228-2 (e.g., a sink in this example). Here, in this example, a writer/sink interface may pull data from at least one client process and deposit it to a memory pool (e.g., possibly as fast as a client process may be able to deliver such data) and certain other writers may simply accept data generated/pushed by their client processes. By way of example, a writer's write-cycle may be initiated in response to a client interface asserting a 'DataValid' signal and terminated in response to a Writer Interface asserting a 'DataAck' signal as shown in FIG. 8E. Thus, a writer may, for example, suspend a write transaction by continuing to keep a 'DataAck' signal de-asserted. By way of further example, as shown in FIG. 8F, a writer/sink may initiate a data transfer by asserting a 'DataReq' signal. Thus, a client process may, for example, assert a 'DataValid' signal once it has a valid data to transfer to the writer/sink. Here, for example, a data transfer may occur in response to a 'DataValid' signal being asserted in the presence of 'DataReq'. A sink client process may, for example, keep a 'DataValid' signal asserted in advance of a 'DataReq' from a writer/sink. On the other hand, a sink client process may also hold back a flow of data by de-asserting a 'DataValid' signal.

In certain example implementations, quaternary writers and/or sinks may be provided. For example, it may be useful to employ quaternary writers and/or sinks to service bandwidth-intensive applications. Non-unary interfaces may, for example, transfer more than one data-unit across a client interface in a single clock cycle. In certain example implementations, a virtual buffer interface capability may include selected and/or a variety of unary, binary, quaternary writers/sinks, and/or the like. Note that quaternary writers/sinks in certain implementations may use up to 100% of a memory bandwidth from a physical bank.

Certain example quaternary writers and sinks may be able to throttle a flow of data from one or more client processes. In this way, for example, while burst transfers of four data-units per cycle may be supported by quaternary interfaces, an average throughput may be significantly less than a burst rate. In any event, this may be one mechanism that supports interfaces with throughput requires in excess of one data-unit per clock cycle.

Figure 8G:
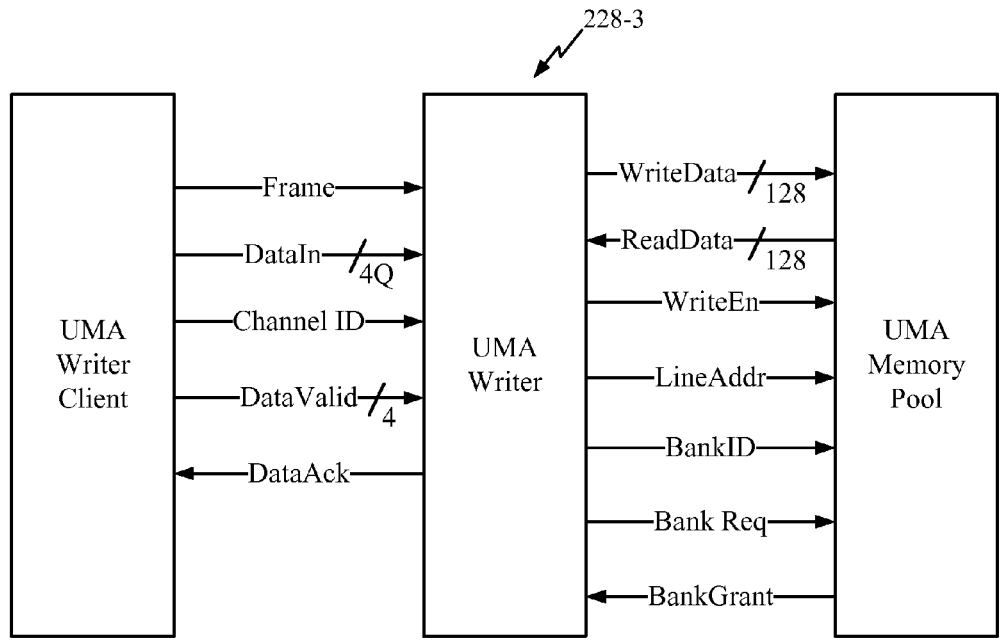
Figure 8H:
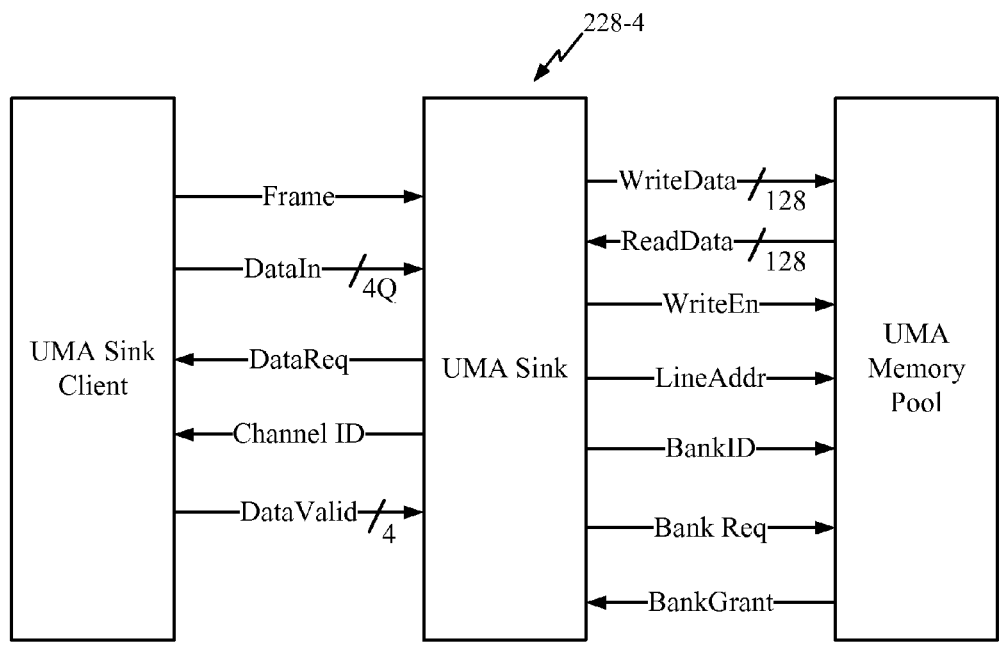

Certain example quaternary writers/sinks may be similar to unary writers except, for example, quaternary interfaces may feature a 4-bit wide valid signal to indicate a number and location of data-units transferred across a client interface. Certain example quaternary interfaces may transfer four data-units per cycle for all cycles except possibly a last one. The last transfer may, for example, be assumed to be lsb-justified, with all unused bits set to zero and valid signals corresponding to valid data-samples will asserted. Hence, in certain implementations, only the following combinations of valid signals may be "proper" for Quaternary interfaces: '0001', '0011', '0111' and '1111'. A client attempt to perform a data-transfer with non-compliant signaling may, for example, result in undefined or otherwise undesired behavior. FIGS. 8G and H graphically present some example quaternary writers 228-3 and 228-4 (e.g., shown as a sink), which are similar to those shown in FIG. E and F, respectively.

Figure 9:
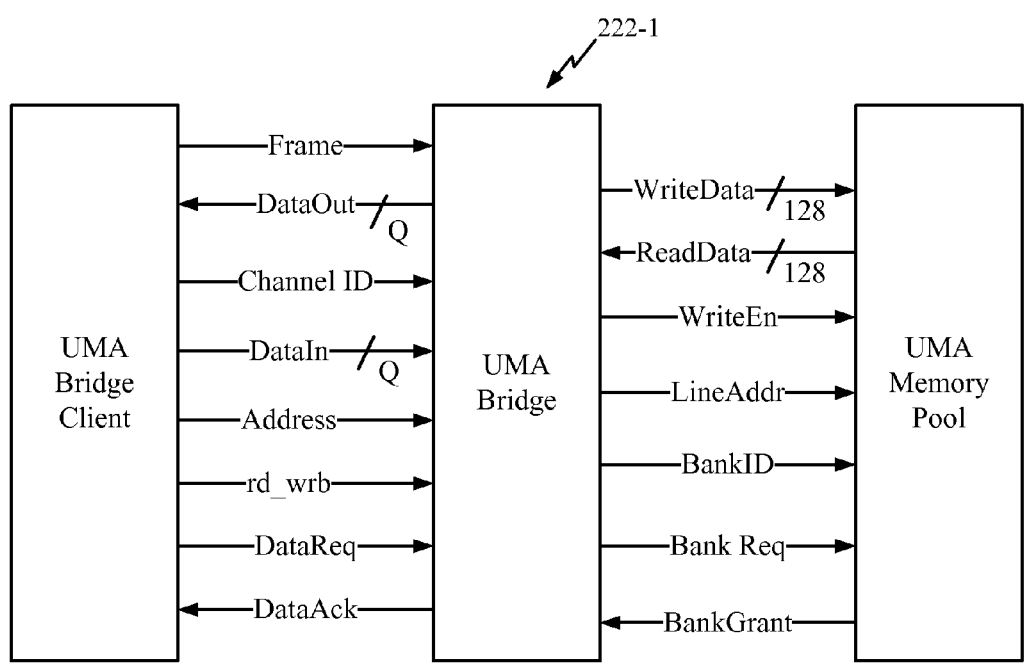
FIG. 9 is a schematic block diagram illustrating an example bridge that may be implemented in a virtual buffer interface capability to interface certain client processes with a memory pool capability, in accordance with an implementation.

FIG. 9 presents a block diagram illustrating an example bridge 222-1 that may be implemented in a virtual buffer interface capability to interface certain client processes with a memory pool capability, in accordance with an implementation. Bridge 222-1 may comprise capabilities that allow it to operate in some manner as a reader/source and/or writer/sink. Thus, bridge 222-1, may accept an explicit virtual address from a client process and client processes may, for example, perform both read and write transactions using bridge 222-1. Thus, for example, a client process may take responsibility for initiating data transfers across such example bridges.

With this in mind, it may be that certain example bridges employ operations that are more complicated than certain example reader or writer operations. However, certain bridges may be designed to perform read-only operations; such bridges may be analogous to certain example readers. In other example implementations, write-only bridges may be provided. In certain example implementations, "simple" bridges such as bridge 222-2 in FIG. 10 and/or various forms of more "high-performance" bridges such as bridge 222-3 in FIG. 11 may be provided.

Figure 10:
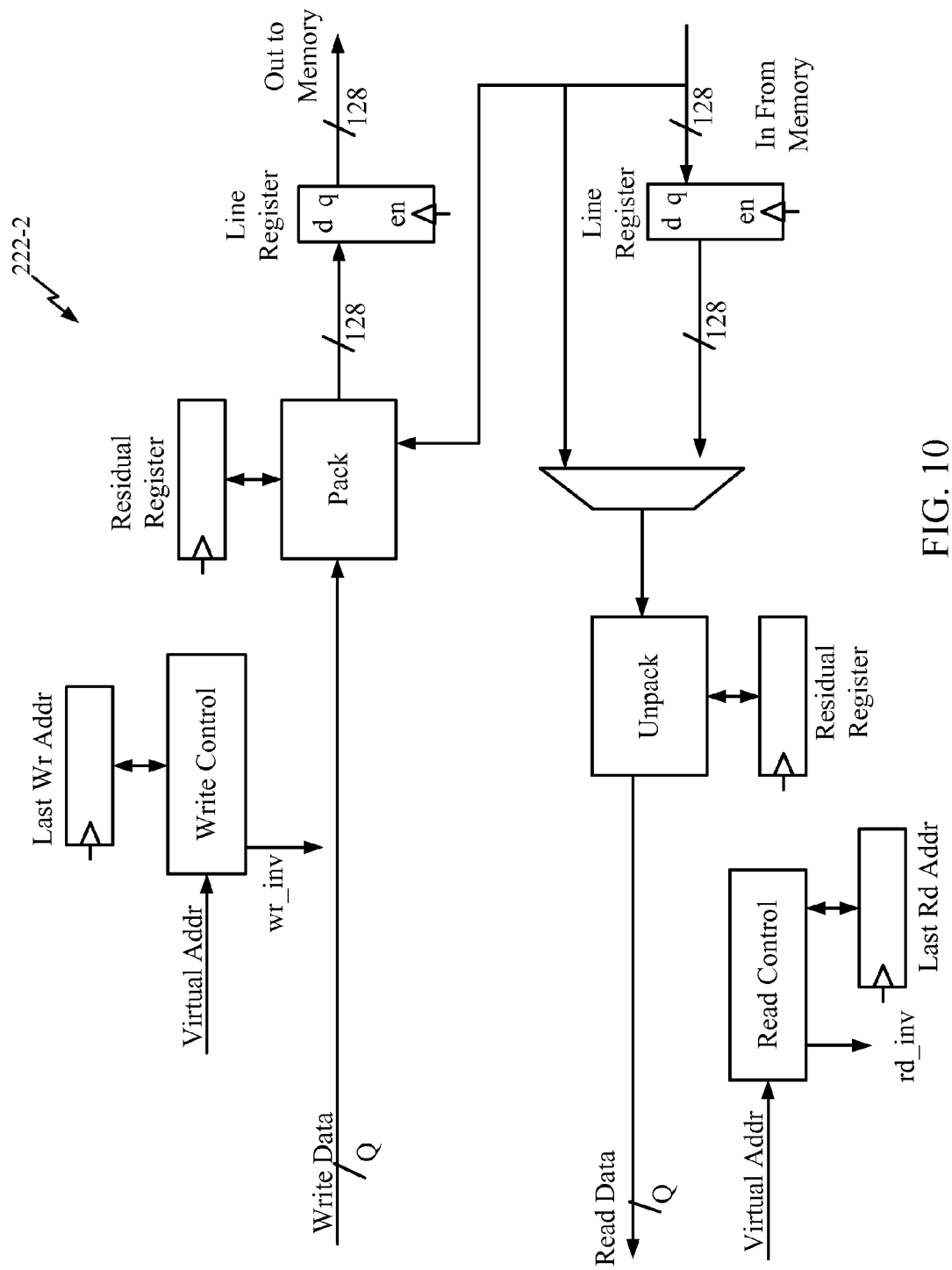
FIG. 10 is a schematic block diagram illustrating example bridge logic that may be implemented in a virtual buffer interface capability, in accordance with an implementation.

FIG. 10 shows a schematic block diagram illustrating a data-path for an example "simple" bridge 222-2. Here, bridge 222-2 comprises a one line-register for a read path and a one line register for a write path. In addition, there may be a register each for logging a line-address of a last physical memory read and write operations that were attempted by the bridge. Further, for example, there may be a (single) residual register for packing and another for unpacking operations.

Such example simple bridge may continue to read data in from linear addresses in physical memory as long as the client process continues to access virtual addresses within range of the data stored in the read line register. An attempt to read data from a virtual address not within range of the line-register may, for example, result in a new read transaction and line and residual registers may be flushed in response.

A write operation for such example simple bridge may be analogous. Thus, for example, writes to contiguous locations may be packed into a line register and then written to memory. An attempt to write to a non-contiguous virtual address may, for example, result in a write-invalidate operation. Contents of both line register and residual registers may be written to memory though a read-modify-write operation and the write-data may be stored locally. As such, a second read-modify-write operation may be required to synchronize a write operation.

Figure 11:
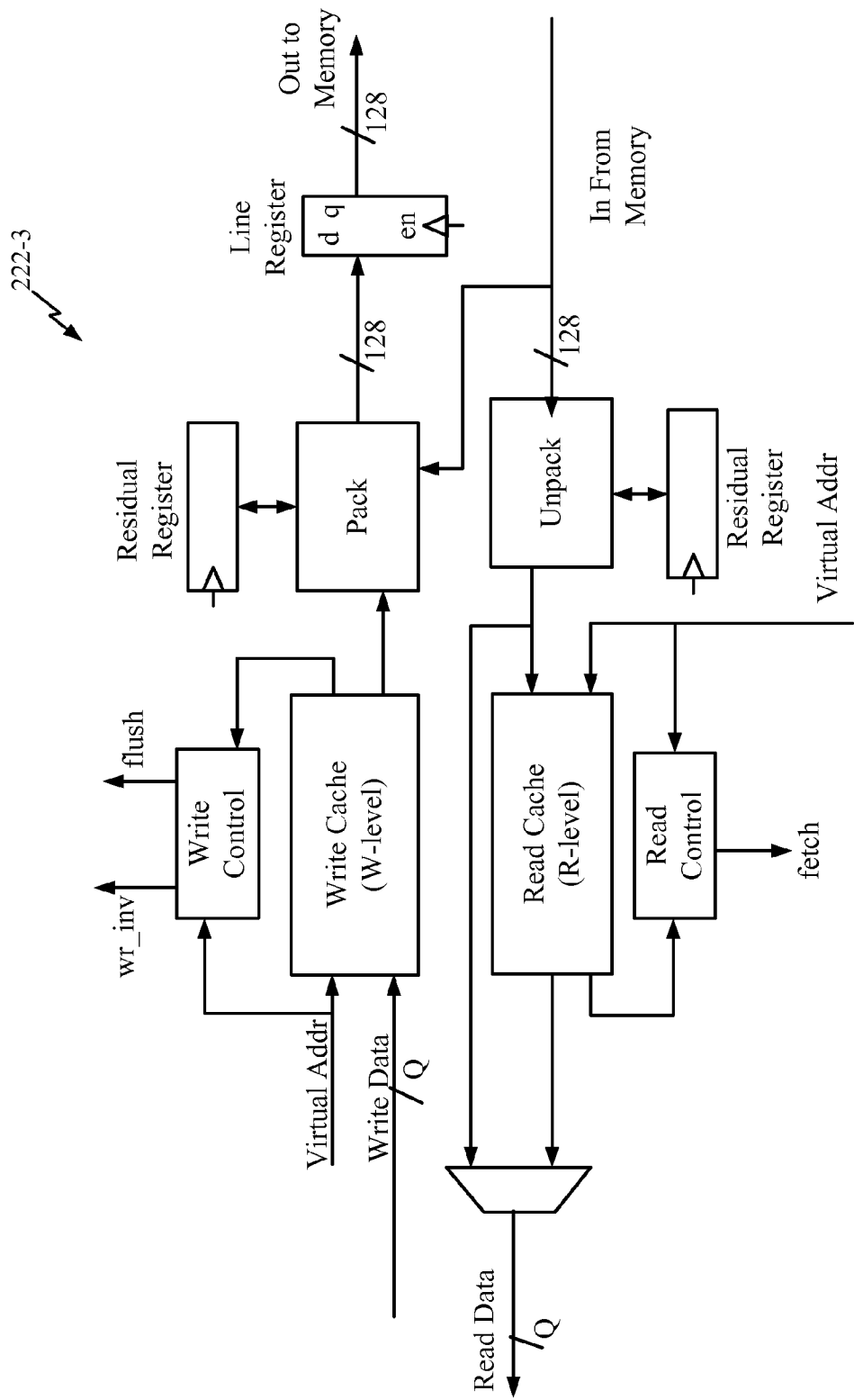
FIG. 11 is a schematic block diagram illustrating example bridge logic further comprising cache memory that may be implemented in a virtual buffer interface capability, in accordance with an implementation.

FIG. 11 shows a schematic block diagram similar to that of FIG. 10, but further illustrating a data-path for an example "high-performance" bridge 222-3 that employs the use of a local read- and/or write-cache memory. Even a small (e.g., 4-level) cache may significantly improve the performance in certain implementations.

Figure 12:
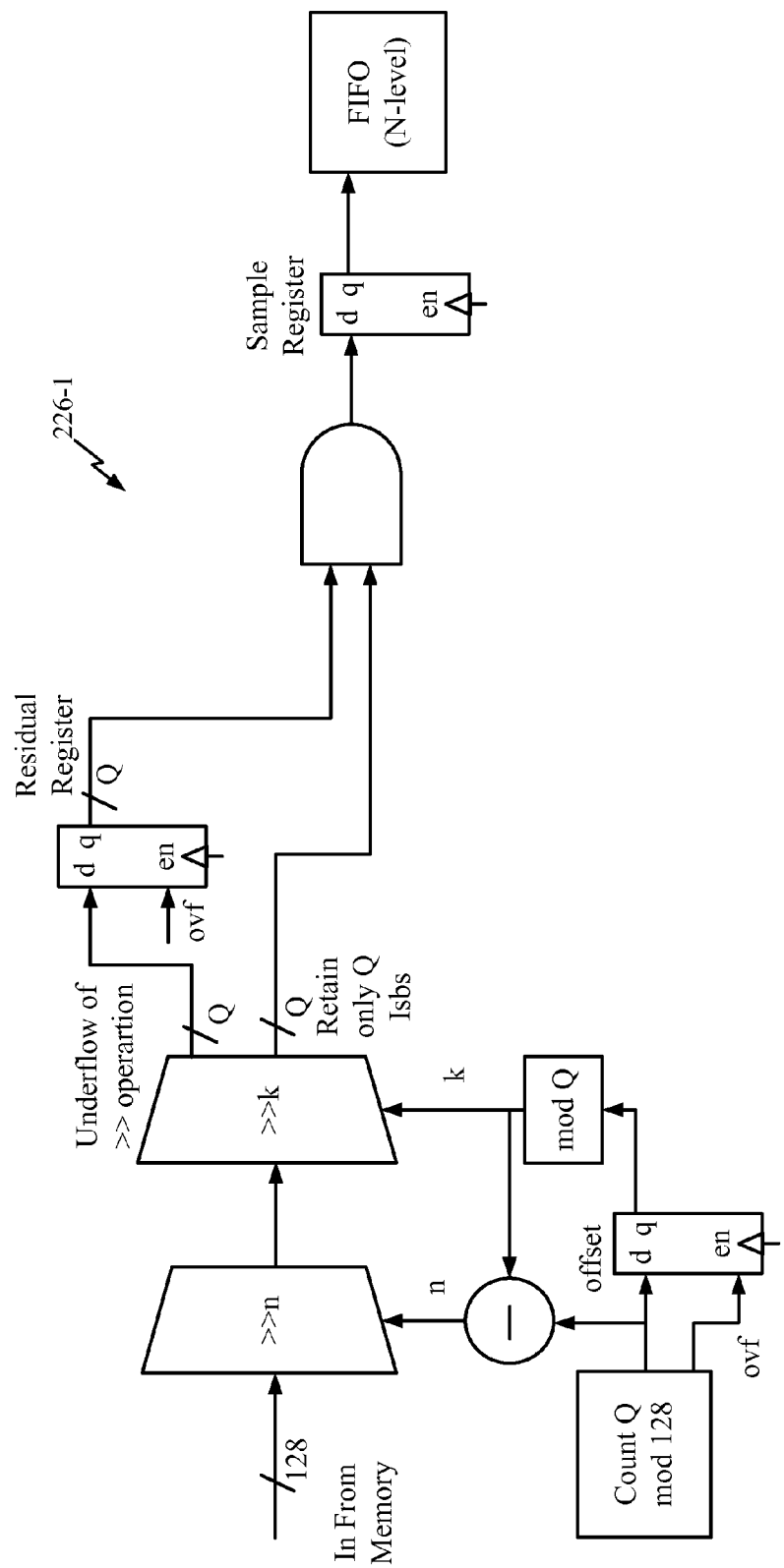
FIG. 12 is a schematic block diagram illustrating example unpacking logic that may be implemented in a virtual buffer interface capability, in accordance with an implementation.

Attention is drawn next to FIG. 12, which presents a block diagram illustrating example unpacking logic 226-1 that may be implemented in a virtual buffer interface capability, in accordance with an implementation.

As mentioned previously, certain example readers/sources and/or bridges may implement an unpacking scheme to retrieve data associated with one or more associated virtual buffers. As illustrated the example logic functionality shown in FIG. 12, an example unpacking scheme may be a function of the bit-width Q of the data-units and the width of the read interface. Thus, certain example readers may deliver an integer number of data-units to their client processes in a single clock cycle (e.g., conditioned on the availability of data, of course). Certain example unitary reader interfaces may be defined/provided as interfaces that deliver a maximum of a unitary (one) Q-bit data-unit to their clients. A unitary interface may, for example, compute a destination bank address and physical address based on its internal VBUFF_CUR-R_INDEX.

As shown in FIG. 12, a reader and/or source interface may comprise a Q-bit residual register for storing partial data-units. Data read from a physical memory may be shifted by an appropriate amount (e.g., denoted by 'n' and 'k') and stored in a Q-bit sample register. As a reader/source reads a line from physical memory, it may attempt to extract as many data-units from physical memory as possible and store the results into a (internal) FIFO. Bits that remain may, for example, be stored in a residual register for use in conjunction with the next memory read.

Figure 13:
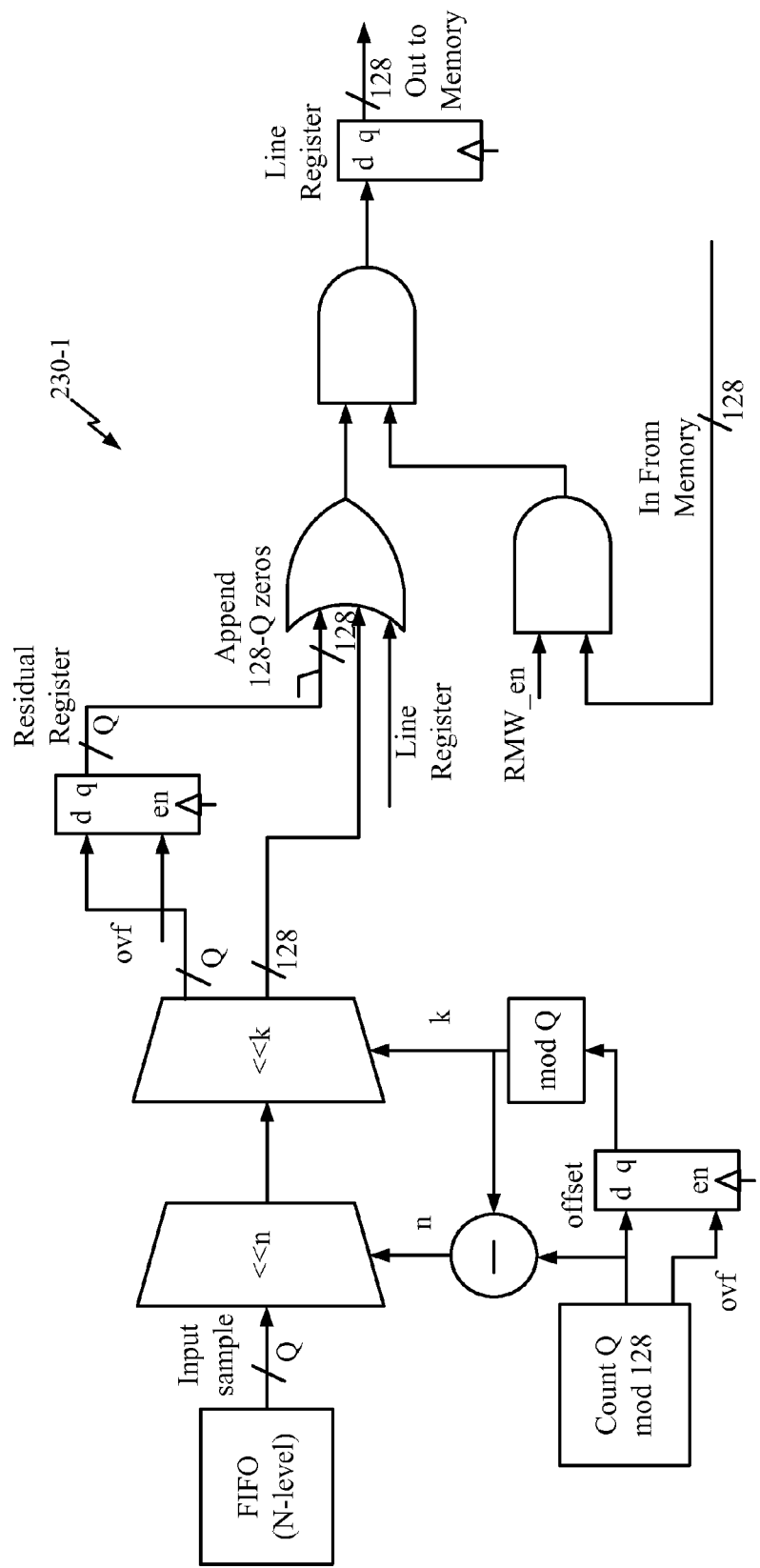
FIG. 13 is a schematic block diagram illustrating example packing logic that may be implemented in a virtual buffer interface capability, in accordance with an implementation.

Attention is drawn next to FIG. 13, which presents a block diagram illustrating example packing logic 230-1 that may be implemented in a virtual buffer interface capability, in accordance with an implementation.

Here, for example, certain writers/sinks, and/or bridges may implement a packing scheme to deposit data into memory associated virtual buffers. A packing scheme may, for example, be a function of bit-width Q of the data. Certain example writers may, for example, accept an integer number of data-units from their clients in a single clock cycle.

Certain example unitary writer interfaces may be defined as interfaces that accept a maximum of one Q-bit data-unit from their clients. A unitary interface may, for example, compute a destination bank address and physical address based on its (internal) VBUFF_CURR_INDEX. Certain example unitary interfaces may comprise a Q-bit residual register for storing partial data-units.

As shown in the example of FIG. 13, packing logic that may be implemented by writers/sinks and/or bridges using a 128-bit line-register to pack data before writing it to memory. In response to being enabled, as long as a FIFO may be not empty, a writer may extract one sample from its (internal) FIFO, shift it by an appropriate amount (e.g., given by 'n' and 'k' in the figure) and write it in the appropriate location in a Line Register. Any bits left over from the packing operation (e.g., overflow of the shifters) may be logged within a Residual Register for use in the next packing operation. Note that, unlike some example readers/sources, some example writers/sinks may perform a read-modify-write operation at the start of a transfer.

As mentioned, a virtual buffer interface capability may also support and/or otherwise provide multi-channel interfaces. For example an interface may be designed to support more than one logical channel over the same physical interface. These logical channels may, for example, be identified by a ChannelID field and/or the like. An interface may, for example, comprise one or more internal registers to map a particular ChannelID to a separate virtual buffer and/or to a separate offset within the same virtual buffer.

Certain multi-channel readers may, for example, comprise separate instances of address translation registers for each ChannelID. Here, for example, a client reading from a specific ChannelID may result in read transactions from an associated physical address. While it may be not required, in certain implementations some or all multichannel interfaces may keep a separate data FIFO for each ChannelID.

Certain multichannel writers may, for example, accept write transactions to different ChannelIDs. While it may be not required, in certain implementations some multichannel interfaces may keep a separate data FIFO for each ChannelID. In certain implementations, multichannel writers may share a line-register but may employ a separate instance of a residual register for each ChannelID.

Certain multichannel sources and sinks may be similar to Multichannel reader and writers, respectively, except that such sources and sinks may be responsible for generating ChannelID. Here, for example, it may be possible for an interface-initiated transaction corresponding to one ChannelID to block the progress of other pending transactions for other ChannelIDs. In certain implementations, it may be useful for client processes that access such sources and/or sinks to be designed to avoid such scenarios, and/or certain robust mechanism(s) may be employed to deal with such scenarios should such possibly occur.

Certain example multichannel interfaces make a plurality of operations possible. For example, certain implementations may allow for possible interleaving and de-interleaving of a plurality of sample-streams and/or the like using multichannel interfaces. In certain example implementations it may also be possible to create simple switches and/or relays, etc. using ChannelID mapping. In certain example implementations, it may be possible to create simple interconnects using certain multichannel Interfaces. Multiple processing elements may, for example, be joined together using ChannelID based switching.

Figure 4:
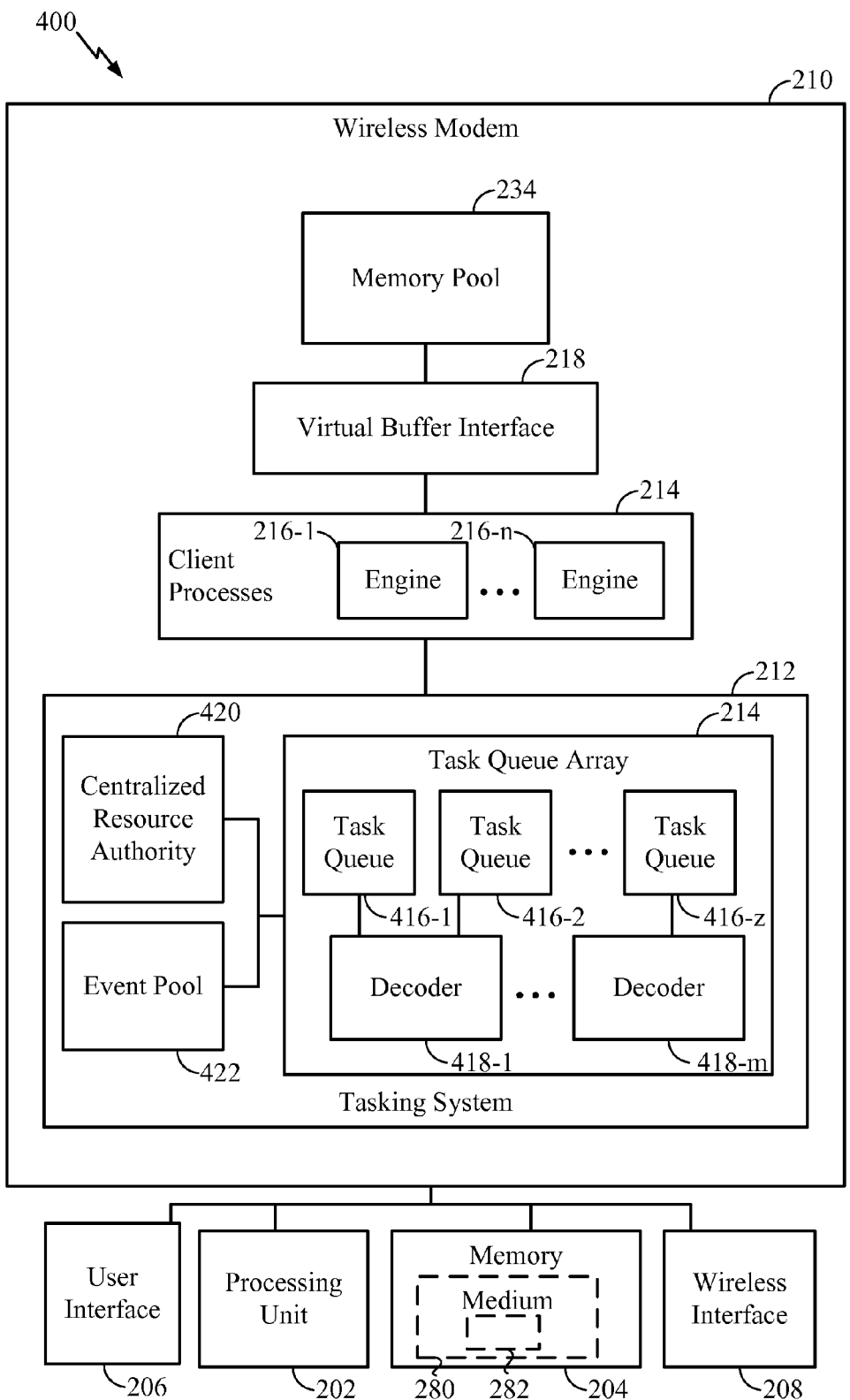
FIG. 4 is a schematic block diagram illustrating an example a task queue interface capability, in accordance with an implementation.

Example Task Queue Interface Methods and Apparatuses:

FIG. 4 illustrates an example implementation of an apparatus 400 that may be enabled to perform all or part of a process 500 (FIG. 5) to provide a task queue interface capability at least in part using a tasking system 212, and which may be included in apparatus 100 (FIG. 1A-C).

By way of example, apparatus 400 may comprise a (centralized) resource authority (CRA) 420 which may selectively route task information to one or more of a plurality of shared client processes 214 (shown here as possibly comprising a plurality of engines 216-1 through 216-n).

As shown, apparatus 400 may also comprise a task queue array 414 comprising a plurality of task queues 416 which may provide task information to resource authority 420 for routing to the one or more of a plurality of shared client processes 214/engines 216, for example. Apparatus 400 may further comprise at least one task decoder 418 coupled to at least one of the plurality of task queues 416. Here, for example, task decoder 418 may selectively alter at least a portion of the task information by affecting execution of at least one task thread associated with at least one of the plurality of task queues 416.

In certain example implementations, apparatus 400 may further comprise an event pool 422 coupled to at least one of the plurality of shared client processes 214/engines 216, at least one of the plurality of task queues 416, and/or at least one task decoder 418. Here, for example, event pool 422 may provide access to event information associated with at least one of: the one or more of a plurality of shared client processes 214/engines 216, the one or more of the plurality of task queues 416, and/or at least one task decoder 418.

Figure 14:
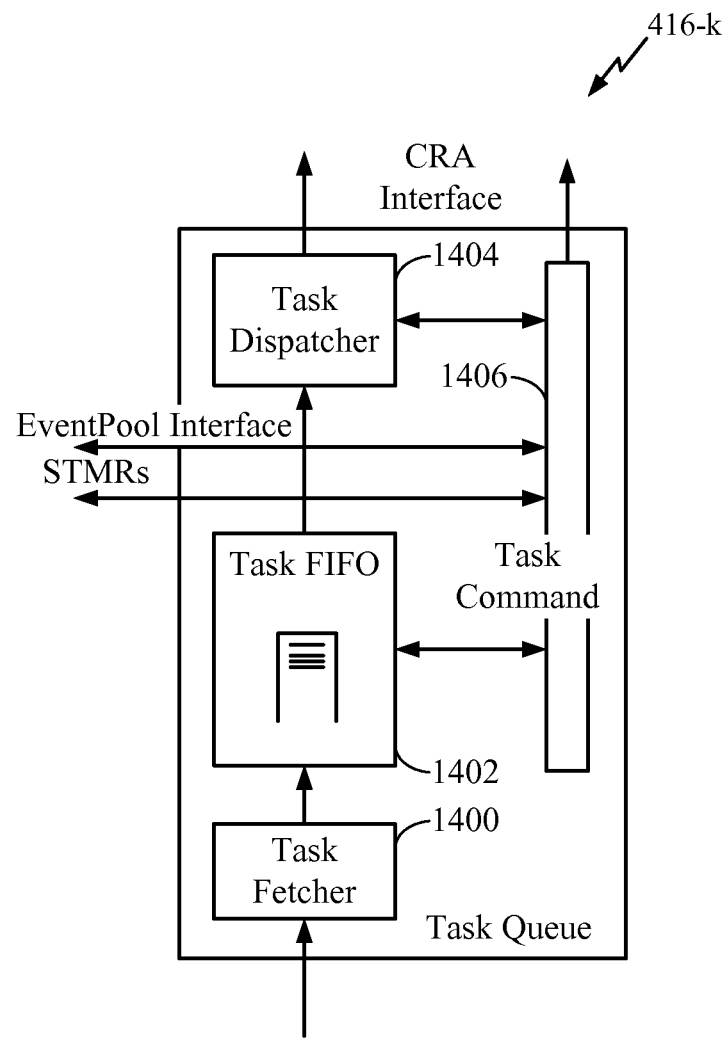
FIG. 14 is a schematic block diagram illustrating an example task decoder that may be implemented in a tasking system interface capability, in accordance with an implementation.

In certain example implementations, at least one of the plurality of task queues 416 may comprise a task fetcher 1400 (see FIG. 14) which may obtain at least a portion of at least one task thread. In certain example implementations, at least one of the plurality of task queues 416 comprises a task buffer 1402 (see FIG. 14) which may store at least a portion of at least one task thread.

In certain example implementations, at least one task decoder 418 may selectively alter at least the portion of at least one task thread stored in the task buffer. For example, in certain example implementations, at least one task decoder 418 may operatively bypass at least the portion of at least one task thread stored in the task buffer. Here, for example, at least one of the plurality of task queues 416 may comprise a task dispatcher 1404 (see FIG. 14) coupled to at least one task decoder 418, e.g., via a task control portion 1406 (see FIG. 14) to selectively provide an altered portion of the task information to the resource authority 420. Task dispatcher 1404 may, for example, provide for control handshaking and/or other like information exchange with CRA 420. Task Control portion 1406 may, for example, also provide an interface to event pool 422 over which event, timing, and/or other like information may be exchanged.

In certain example implementations, at least one task decoder 418 may selectively alter at least the portion of the task information based, at least in part, on at least one identifier within at least one task thread. In certain example implementations, at least one task decoder 418 may obtain event information and selectively alter at least the portion of the task information based, at least in part, on the event information. In certain example implementations, at least one task decoder 418 may selectively alter at least the portion of the task information based, at least in part, on at least one conditional determination. For example, with regard to FIG. 14, task control portion 1406 may provide an identifier (e.g. an opcode and/or the like) identified in buffer 1402 to a task decoder 418, which may in response selectively alter at least the portion of the task information and provide such back through task control portion 1406 to buffer 1402 and/or task dispatcher 1404.

In certain instances, for example, task decoder 418 may selectively alter at least a portion of the task information based, at least in part, on the identifier and/or an opcode or the like. In certain instances, for example, task decoder 418 may selectively alter at least a portion of the task information based, at least in part, on information associated with decoder 418, event pool 422, and CRA 420.

Figure 5:
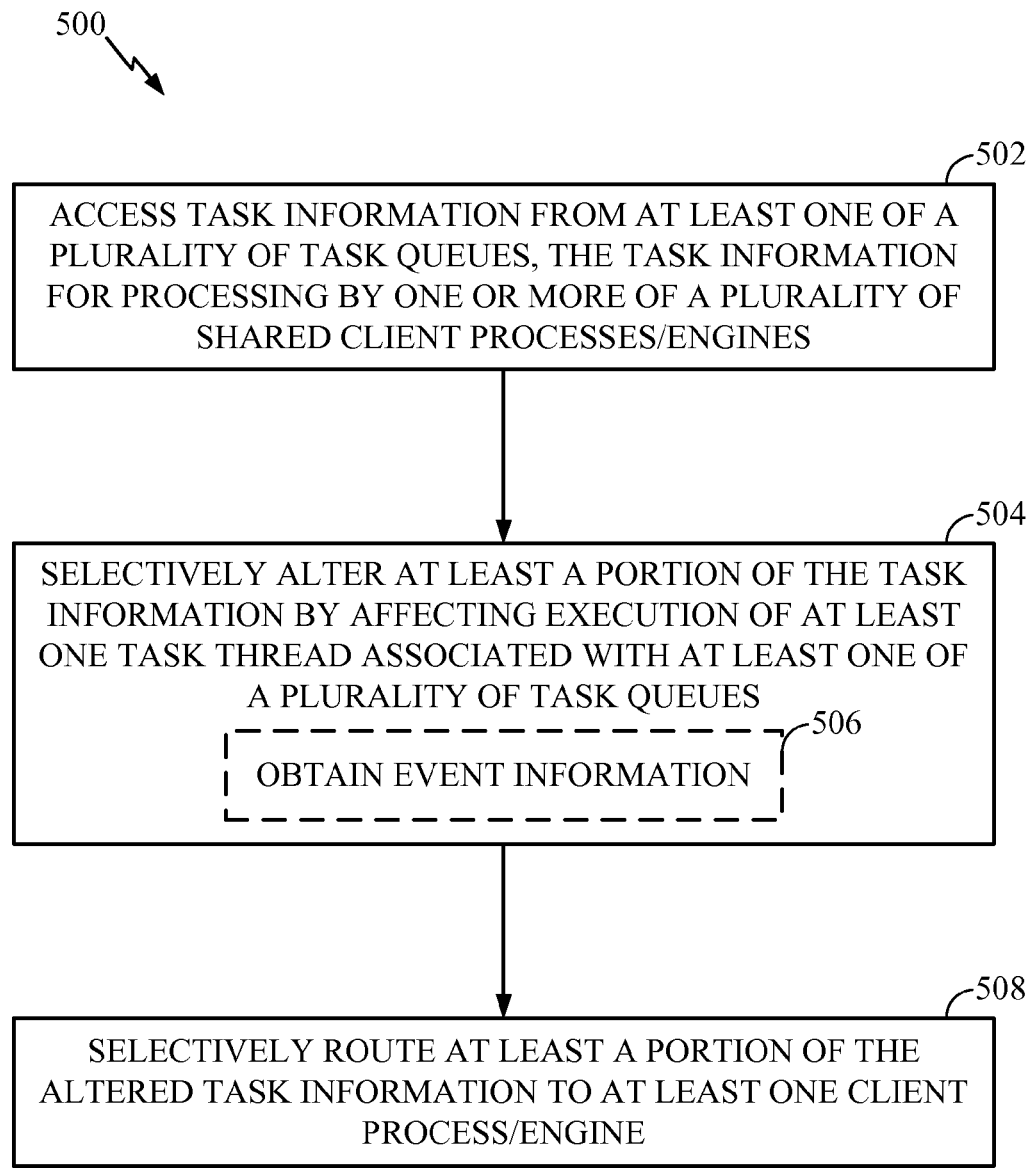
FIG. 5 is a flow-diagram illustrating an example process for use in providing a task queue interface capability, in accordance with an implementation.

With reference now to FIG. 5, a process 500 may, for example, be performed by a wireless modem 210 (FIG. 4). At block 502, process 500 may access task information from at least one of a plurality of task queues, the task information for processing by one or more of a plurality of shared client processes/engines. At block 504, process 500 may selectively alter at least a portion of the task information by affecting execution of at least one task thread associated with at least one of a plurality of task queues. For example, at block 506, event information may be obtained and at least a portion of the task information altered based, at least in part, on the event information. At block 508, process 500 may selectively route at least a portion of the altered task information to at least one client process/engine.

In certain example implementations, an article of manufacture may be provided which comprises a computer-readable medium 280 having stored thereon computer-implementable instructions 282 executable by at least one processing unit 202 and/or other like processing capability operatively associated with and/or included within apparatus 400 (see FIG. 4). The computer-implementable instructions 282 may enable at least a portion of the functionality of process 500, for example.

Thus, for example, certain task queue interface methods and apparatuses may be implemented in an apparatus comprising a CRA 420 to selectively route task information to one or more of a plurality of shared client processes. Apparatus 400 may also comprise a task queue array 214 comprising a plurality of task queues 416 to provide said task information to CRA 420 for routing to one or more of a plurality of shared client processes (engines) 214(216). Apparatus 400 may also comprise at least one task decoder to selectively alter at least a portion of the task information by affecting execution of at least one task thread associated with said at least one of the plurality of task queues. In initial task thread may, for example, be obtained from a memory 204 and/or a processing unit 202.

Apparatus 400 may also comprise an event pool 422 to provide access to event information associated with one or more client processes, one or more task queues, and/or one or more task decoders.

As such, tasking system 212 may provide a mechanism for managing the operation of multiple concurrent processing threads and, in certain implementations, selectively affecting one or more such processing treads based on one or more detectable conditions and/or based on a specified operational code (opcode) and/or other like instructions/information.

As illustrated, for example, a task queue 416 within task queue array 214 may selectively execute a sequential flow of tasks. Here, for example, a series of related tasks may be provided as part of a sequential program flow. A program flow may, for example, be associated with (e.g., proceeded by) an explicit reservation request to CRA 420 for resources at a specified time-instance and/or event. A program flow at a head of each task queue may, for example, be activated after a specified event has occurred and/or once resources have been granted. A program flow may terminate, for example, in response to a specified end event/time and/or as a resource allocation expires.

A program flow in a task queue may access one or more shared resources (e.g., here, represented by client processes/engines). An attempt to access a resource that is busy may result in a generation of an exception, and/or the like. A processing unit may, for example, be used to program and/or otherwise configure all or part of tasking system 212, e.g., using a mechanism as described herein on a symbol-by-symbol, a slot-by-slot basis, and/or the like.

In certain example implementations, task decoder 418 may selectively alter at least a portion of at least one task thread stored in a task buffer, and/or operatively bypass at least a portion of at least one task thread stored in a task buffer.

Example Memory Pool Interface Methods and Apparatuses:

Co-pending U.S. Non-provisional patent application Ser. No. 12/896,646, filed Oct. 1, 2010, Titled, "Memory Pool Interface Methods And Apparatuses", presents subject matter directed towards aspects relating to a memory pool interface capability some examples of which are described herein.

Figure 6:
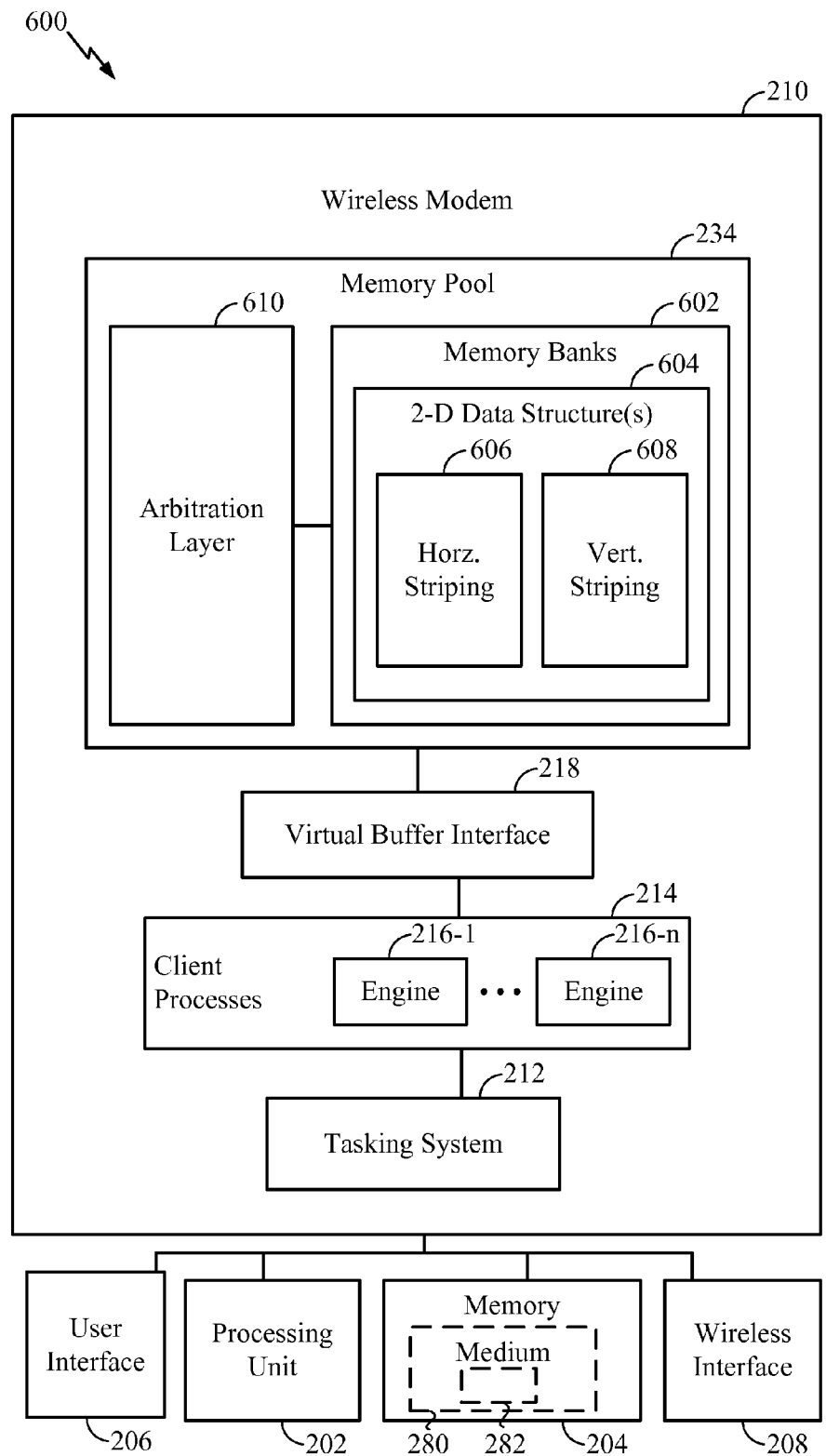
FIG. 6 is a schematic block diagram illustrating an example implementation of a wireless modem apparatus comprising a memory pool capability, in accordance with an implementation.

FIG. 6 presents an example apparatus 600, which may be implemented in apparatus 100 and/or other like devices.

Apparatus 600 may be implemented, for example, to allow for a multiple (e.g., two or greater) dimensional data array to be striped across multiple banks of a memory pool and which may be accessed through arbitration by row or column as might be desired for different client processes/engines.

In this example, apparatus 600 comprises a memory pool 234 having a plurality of individually accessible memory banks 602 coupled to an arbitration layer 610. Arbitration layer 610 may selectively access memory pool 234 on behalf of a plurality of client processes 214/engines 216. Here, for example, at least two of the memory banks 602 are concurrently accessible through and/or as a result of arbitration layer 610 and capable of storing data bits therein within at least a portion of a multidimensional data structure 604.

Multidimensional data structure 604 may comprise a plurality of columns and a plurality of rows, which may be operatively arranged using at least one of: a horizontal striping 606 of data to at least a portion of at least the two of the memory banks 602, and/or a vertical striping 608 of data to at least a portion of at least the two of the memory banks 602.

Arbitration layer 610 may, for example, selectively access (and/or otherwise allow for selective access to) certain data bits by rows in at least one portion of multidimensional data structure 604 on behalf of a first one of the plurality of client processes 214/engines 216. Arbitration layer 610 may also, for example, selectively access (and/or otherwise allow for selective access to) certain data bits by columns in the portion of multidimensional data structure 604 on behalf of a second one of the plurality of client processes 214/engines 216.

In certain example implementations, multidimensional data structure 604 may be operatively arranged based, at least in part on, at least one offset value associated with at least one of the horizontal striping 606 of data and/or the vertical striping 608 of data.

In certain example implementations, arbitration layer 610 may selectively (concurrently) access data bits in a first portion of the multidimensional data structure 604 and data bits in a second portion of the multidimensional data structure 604.

In certain example implementations, multidimensional data structure 604 may comprise at least two different data word bit widths, for example, associated with at least two of the plurality of client processes/engines.

In certain example implementations, arbitration layer 610 may selectively access multidimensional data structure 604 based, at least in part, on at least one access parameter associated with a specified one or more of the plurality of client processes/engines. Here, for example, at least one access parameter may be associated with a priority level of the specified one or more of the plurality of client processes/engines. For example, at least one access parameter is associated with a sequential access request or a non-sequential access request, and/or a read access request or a write access request.

Figure 15:
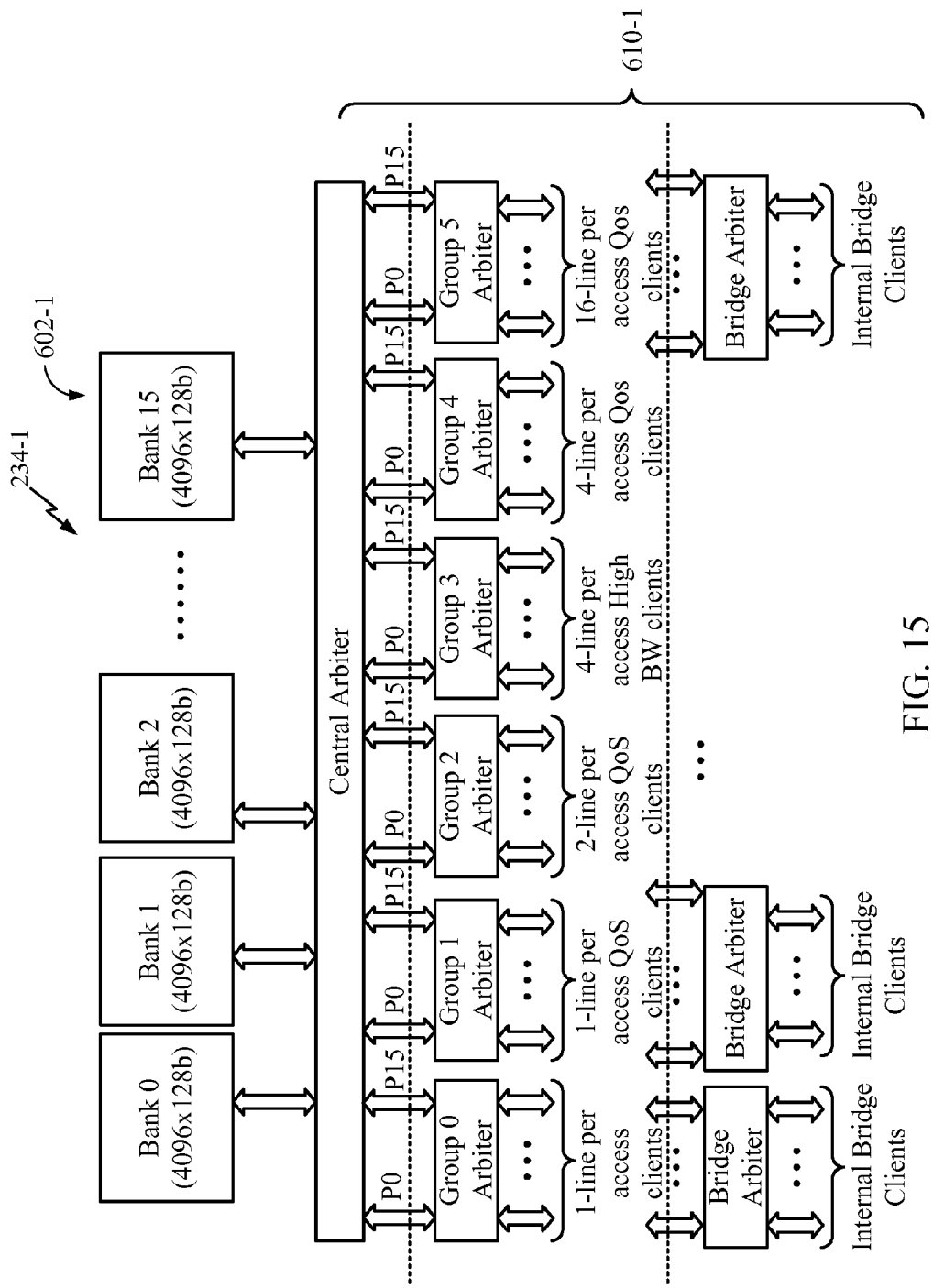
FIG. 15 is a schematic block diagram illustrating an example arbitration layer that may be implemented in a memory pool interface capability, in accordance with an implementation.

In certain example implementations, e.g., as illustrated in FIG. 15, an arbitration layer 610-1 may comprise at least one of a bridge arbiter layer, a group arbiter layer, and/or a central arbiter layer. For example, a bridge arbitration layer may employ a rotating priority arbitration scheme, a token-based arbitration scheme, and/or the like. In certain example implementations, a central arbiter layer may employ a time-division multiplexing scheme, and/or the like. Here, for example, a time-division multiplexing scheme may specify different access time-slots for at least each of at least two of the memory banks 602-1. In certain example implementations a bridge arbiter layer may selectively provide at least a portion of access request information to a specific portion of a group arbitration layer and/or a central arbitration layer. In certain example implementations, a group arbiter layer may selectively provide at least a portion of access request information to a central arbitration layer.

In certain example implementations, a bridge arbiter layer may selectively receive at least a portion of access response information from a specific portion of a group arbiter layer and/or a central arbiter layer. In certain example implementations, a group arbiter layer may selectively receive at least a portion of access response information from a central arbiter layer. In certain example implementations, at least one of a bridge arbiter layer, a group arbiter layer, and/or a central arbiter layer may comprise at least one cross-connect multiplexer and/or the like to selectively route access request information and/or access response information.

In certain example implementations, vertical striping 608 of data may comprise, at least in part, a block vertical striping of data (see appendices for examples).

Figure 7:
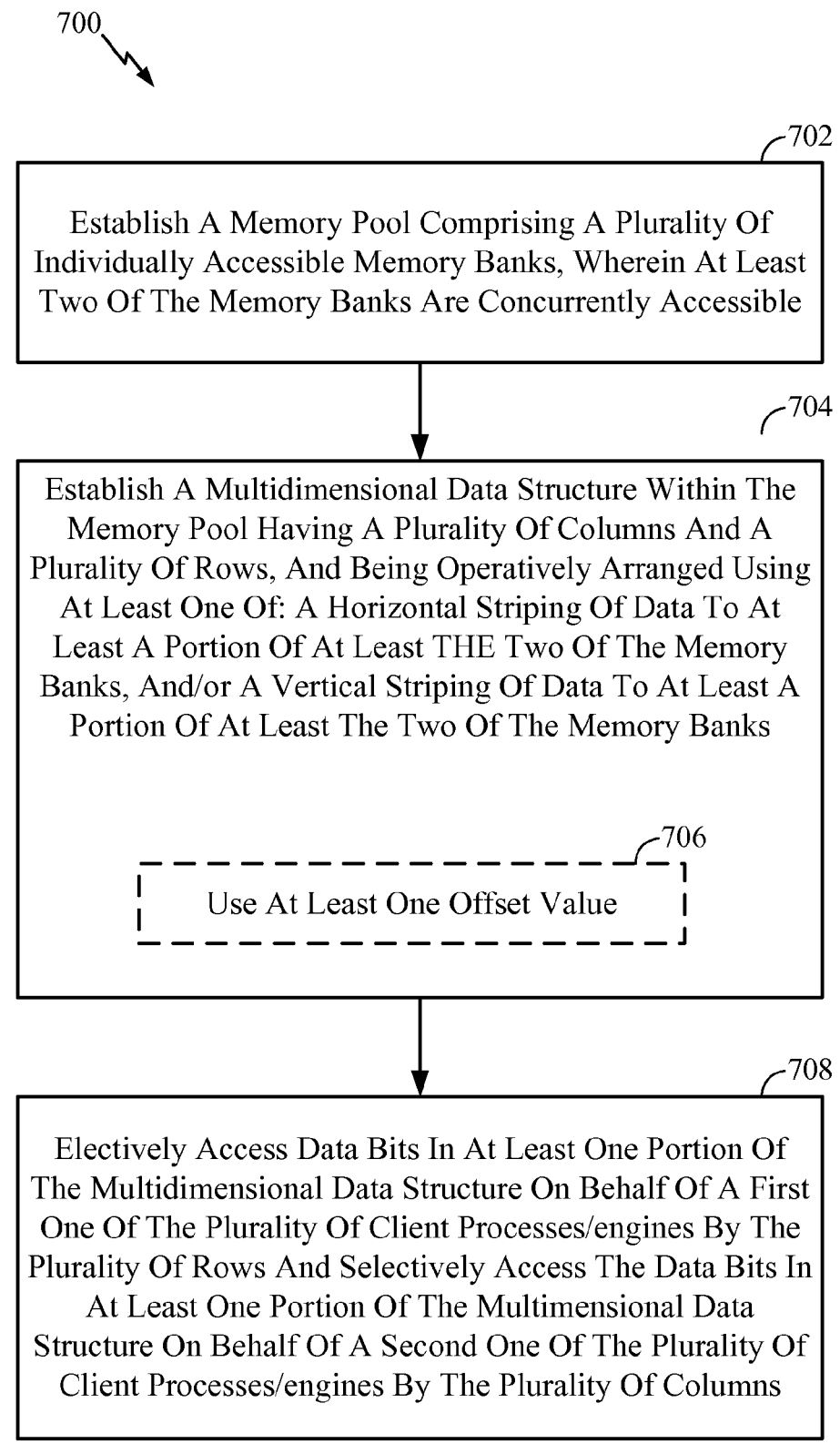
FIG. 7 is a flow-diagram illustrating an example process for use in providing a memory pool capability, in accordance with an implementation.

FIG. 7 presents an example process 700 that may be implemented in apparatus 600 and/or other devices to provide for multiple dimension array striping of data across multiple banks memory that may be accessed through arbitration by row or column as might be desired for different client processes/engines.

At block 702, process 700 may establish a memory pool comprising a plurality of individually accessible memory banks, wherein at least two of the memory banks are concurrently accessible. At block 704, process 700 may establish a multidimensional data structure within the memory pool having a plurality of columns and a plurality of rows, and being operatively arranged using at least one of: a horizontal striping of data to at least a portion of at least the two of the memory banks, and/or a vertical striping of data to at least a portion of at least the two of the memory banks. For example, at block 706, at least a portion of the multidimensional data structure 604 may be established based, at least in part on, at least one offset value associated with at least one of the horizontal striping of data and/or the vertical striping of data.

At block 708, process 700 may selectively access data bits in at least one portion of the multidimensional data structure on behalf of a first one of the plurality of client processes/engines by the plurality of rows and selectively access the data bits in at least one portion of the multidimensional data structure on behalf of a second one of the plurality of client processes/engines by the plurality of columns.

Thus, in accordance with certain aspects of the present description, a plurality of memories may be consolidated and/or otherwise provided for use by a wireless modem 210 and/or other computing device into a centrally arbitrated dynamically-managed memory pool 234-1. The physical memory pool may comprise a variable number of virtual buffers, and may be capable of providing, for example: a plurality of Banks of Physical RAM, arbitration on a bank-by-bank basis, flexible Arbitration scheme(s), multilevel arbitration for scalable operation, an ability to restrict client process access on a bank-by-bank basis, an ability to effectuate configuration based on events and/or the like, an ability to power-down or otherwise affect operation of selected physical RAMs and/or related circuitry, and/or any combination thereof.

With arbitration layer 610, in certain example implementations, a memory pool may be designed to be concurrently accessed by a multitude of client processes/engines. Here, for example, bandwidth and/or QoS requirements of client devices vary. For example, some devices such as, a receiver front-end may require guaranteed access on a periodic basis, while other processes/engines such as, data movers may be designed for background data transfer. Similarly, some client processes/engines, like a QICE engine require sustained high-throughput transfers while other processes/engines such as, e.g., GERAN sample server clients may require a more modest thorough-put level.

By way of example, to support diverse bandwidth and QoS desires, an example memory pool may utilize a multi-level arbitration scheme as illustrated in FIG. 15. Here, for example, client processes may be grouped according to access requirements and/or access patterns, etc., and memory pool access may be arbitrated amongst various groups using a time-division multiplexed central arbiter. In this example, arbitration layer 610-1 shows an exemplary 3-level arbitration scheme that may be used by an example memory pool. There may be a plurality of arbitration layers used by a memory subsystem. This example uses three layers; others may have less or more.

Here, as mentioned previously, bridge arbiters may be provided to arbitrate access between and/or among internal bridge clients. Bridge arbiters may, for example, use a rotating priority arbitration scheme and/or a token-passing arbitration scheme, and/or the like depending on the nature of the bridge. Group arbiters may be provided to group requests from client processes and/or bridge arbiters according to type of access. Clients of Group 0 and Group 1 arbiters may, for example, allow access to the memory pool one line at a time. Note that group arbiters may or may not reside within the memory pool. Client interfaces of the Group 0 arbiter may, for example, connect directly to a memory pool. Here, for example, a central arbiter may grant access to group arbiters, e.g., based on a TDM table and/or other like capability. In such a table, for example, an entry may specify an identity of a group arbiter that may be granted access to a specified bank (BANKm) for a specified time-slot (SLOTm). In certain example implementations, unused time slots may be reclaimed by certain clients (e.g., Group 0 clients).

In certain example implementations, one or more group arbiters may perform local arbitration between and/or among client interfaces seeking access to one or more banks of the memory pool and provide/initiate cross connection(s) (e.g., decode bank ID and redirect requests to arbiter of requested bank).

In certain example implementations, an arbiter may use a version of an NtoM cross-connect multiplexer (not shown). Here, for example, a bank arbiter may receive requests from one or more of the N clients and decide an identity of a "winning" interface for a memory bank. A bank arbiter may, for example, generate one or more grant signals for each of the client interfaces, and may also generate a select signal for an applicable cross-connect multiplexer and/or other like circuitry.

In certain examples, a cross connect multiplexer may route an address and control signals from a client interface to one or more banks based on the select signals. For read transactions a cross connect multiplexer may route a read response from a bank, along with a valid signal, to an appropriate interface for a client process/engine. Since there may be an arbitrary level of pipelining in the round-trip path, one or more select signals may be delayed appropriately to determine the routing path of the read response.

An arbitration scheme for use in a quaternary mode may be provided. e.g., for reader/source client interfaces. Here, for example, some type of multiplexing may be useful. In certain example implementations, a round robin arbitration scheme may be used to establish an order and which may consider an availability of data to be transferred.

In other example implementations, a fixed arbitration scheme may be used, which may enforce some priority scheme. Such priority scheme may be predetermined and/or dynamically determined.

With a memory pool interface capability as described herein, from a client side only virtual buffer addressing need be considered. As such, for example, a reader may provide address translation from a virtual address to a physical memory address. Such address translation may vary depending on implementation regarding memory organization and configuration of the physical memory for the given virtual buffer space.

In an example, a physical memory pool may be composed of M banks of 128-bit single-port memories. Each bank may be arbitrated independently. Therefore, multiple virtual buffers of a virtual buffer interface may access more than one bank of memory separately. Access to a memory pool may, for example, be based on 128-bit line data. Blocks of data may be stored across multiple banks using striping mechanisms to improve bandwidth efficiency.

With this in mind, three example striping modes are described in greater detail below; namely, horizontal, vertical, and block horizontal striping modes. Depending on the size of a virtual buffer in a Q-bit unit, allocated physical memories do not necessarily have a rectangular shape for reducing the unused memory space. Instead, a total amount of physically allocated memory for the given virtual buffer may be a multiple of 128-bit line data and continuous in a given range of line address and bank ID.

Figure 16A:
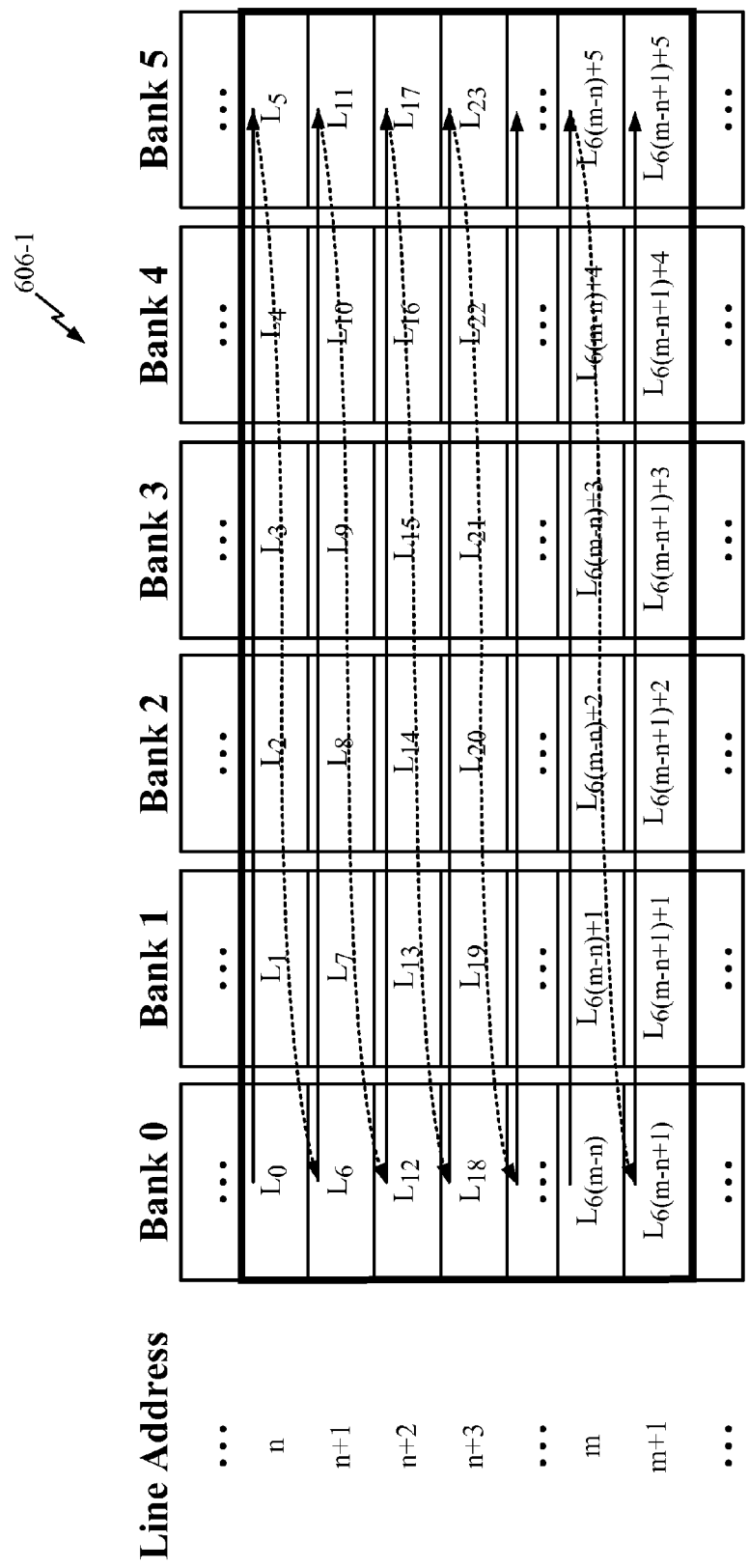
FIG. 16A-B are schematic block diagrams illustrating example horizontal striping of data that may be implemented in a memory pool interface capability, in accordance with an implementation.
Figure 16B:
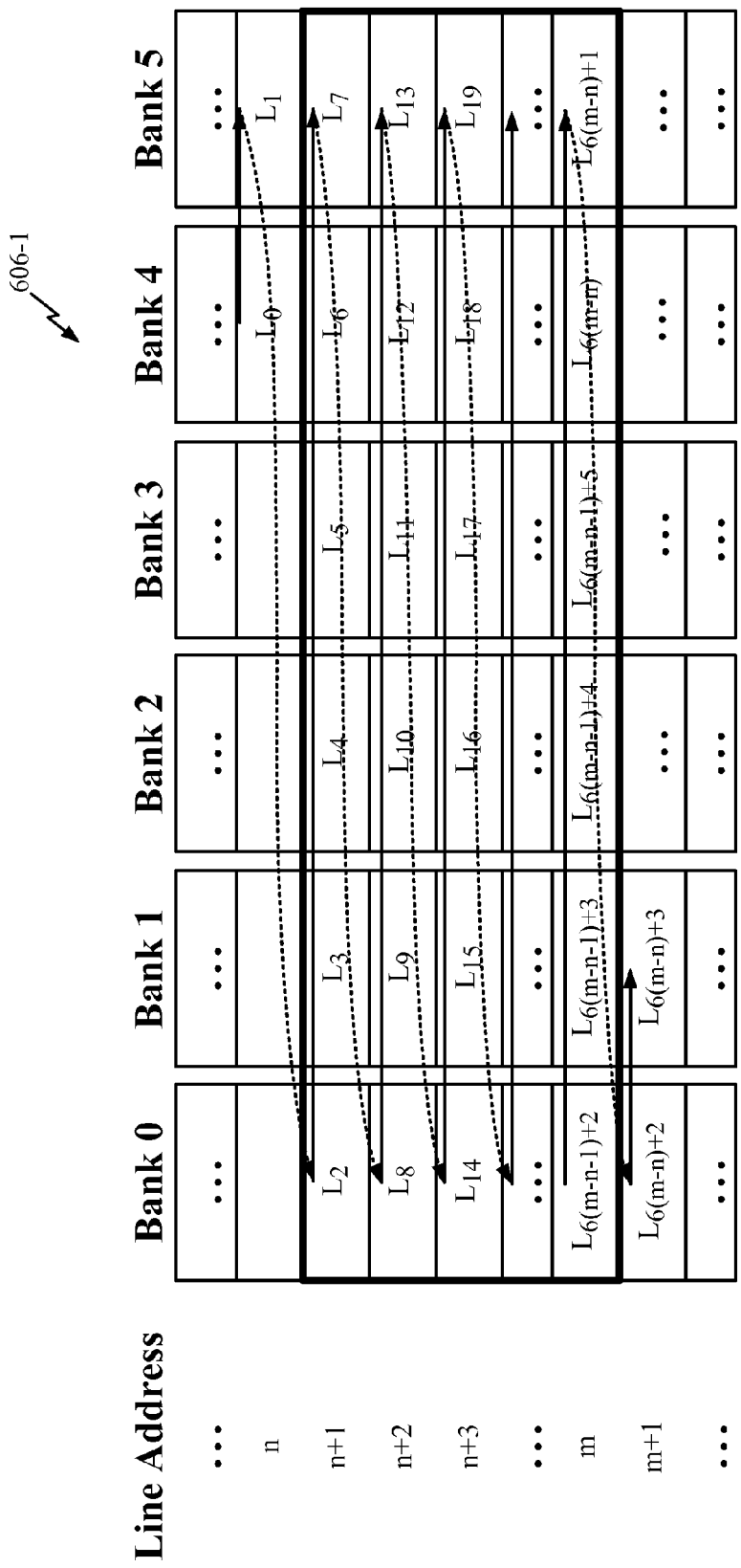
Figure 17:
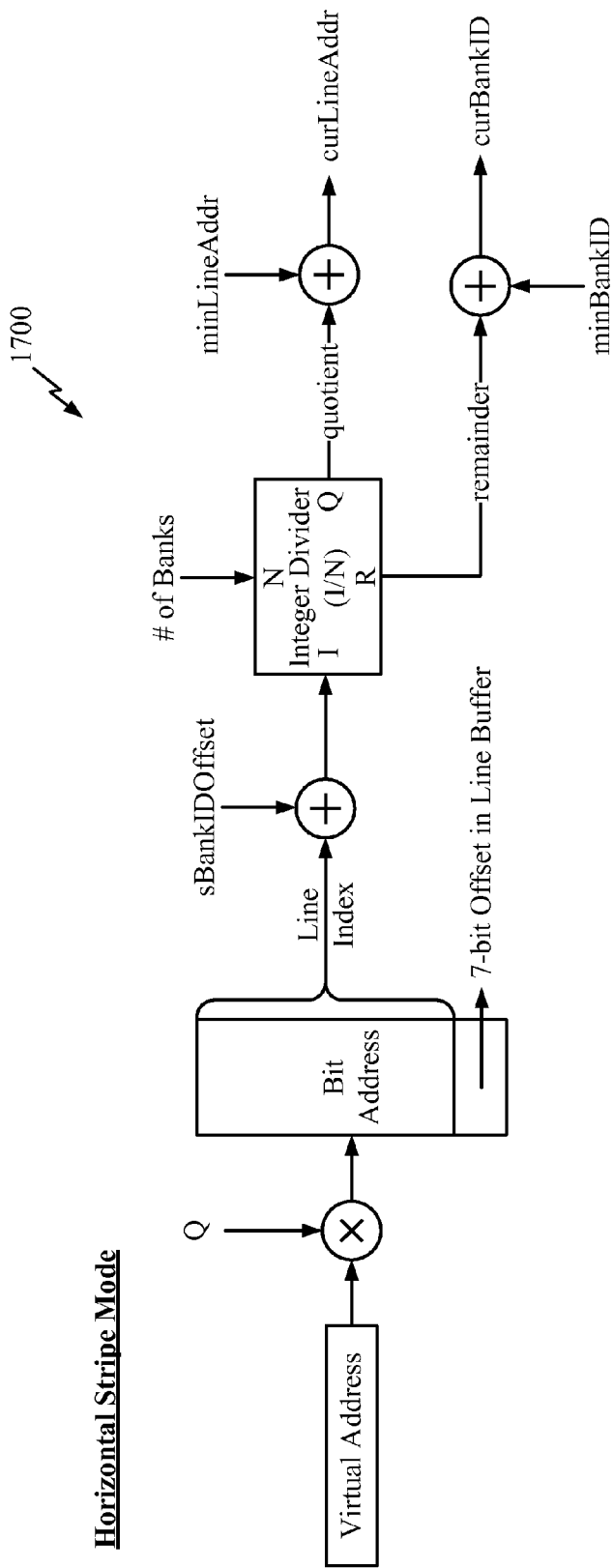
FIG. 17 is a schematic block diagram illustrating example virtual to physical address logic associated with horizontal striping of data that may be implemented in a virtual buffer interface capability and/or a memory pool interface capability, in accordance with an implementation.

FIG. 16A-B, for example, show example horizontal striping 606-1 and FIG. 17 shows an example translation process 1700 for use in translating between virtual and physical addresses associated with such example horizontal striping.

Figure 18A:
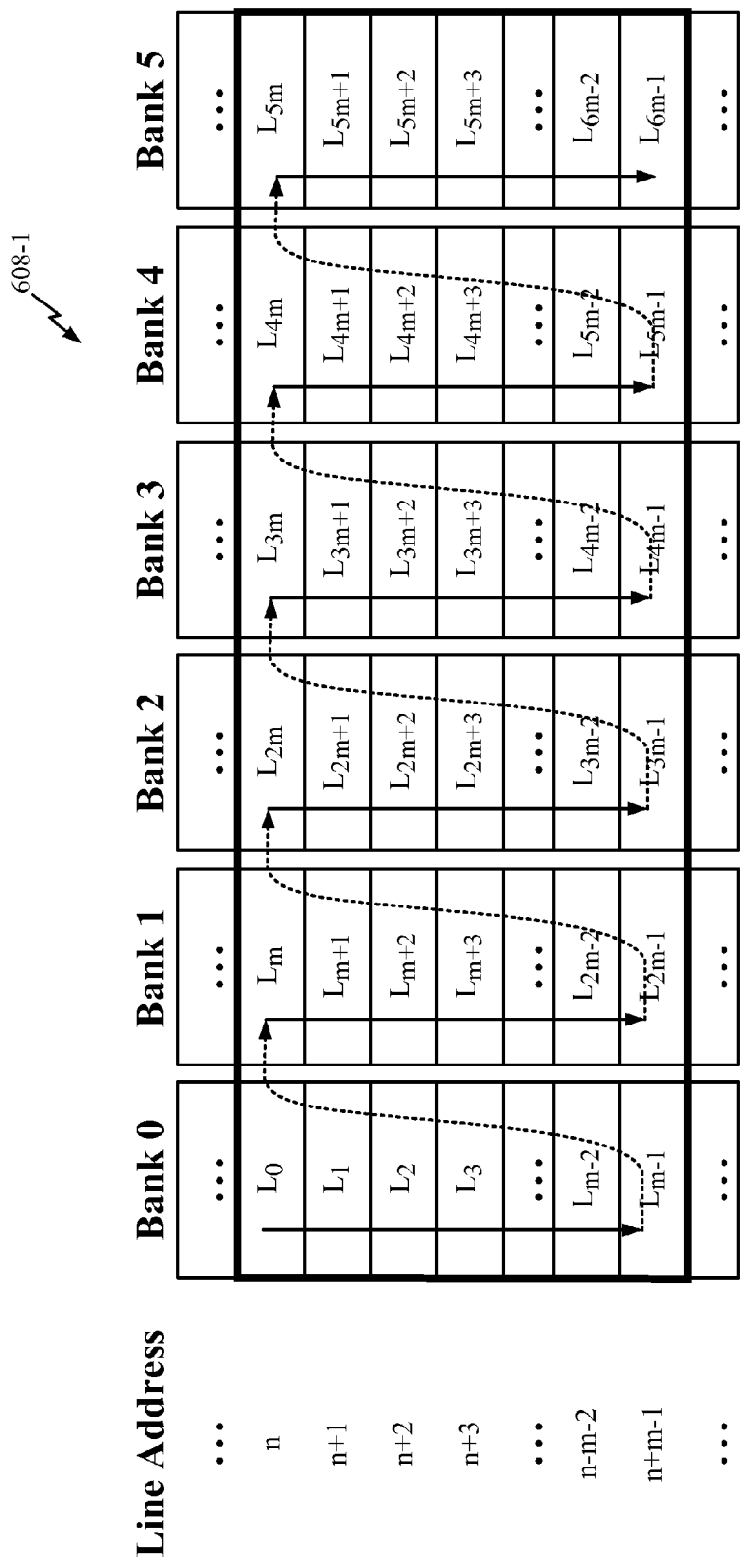
FIG. 18A-B are schematic block diagrams illustrating example vertical striping of data that may be implemented in a memory pool interface capability, in accordance with an implementation.
Figure 18B:
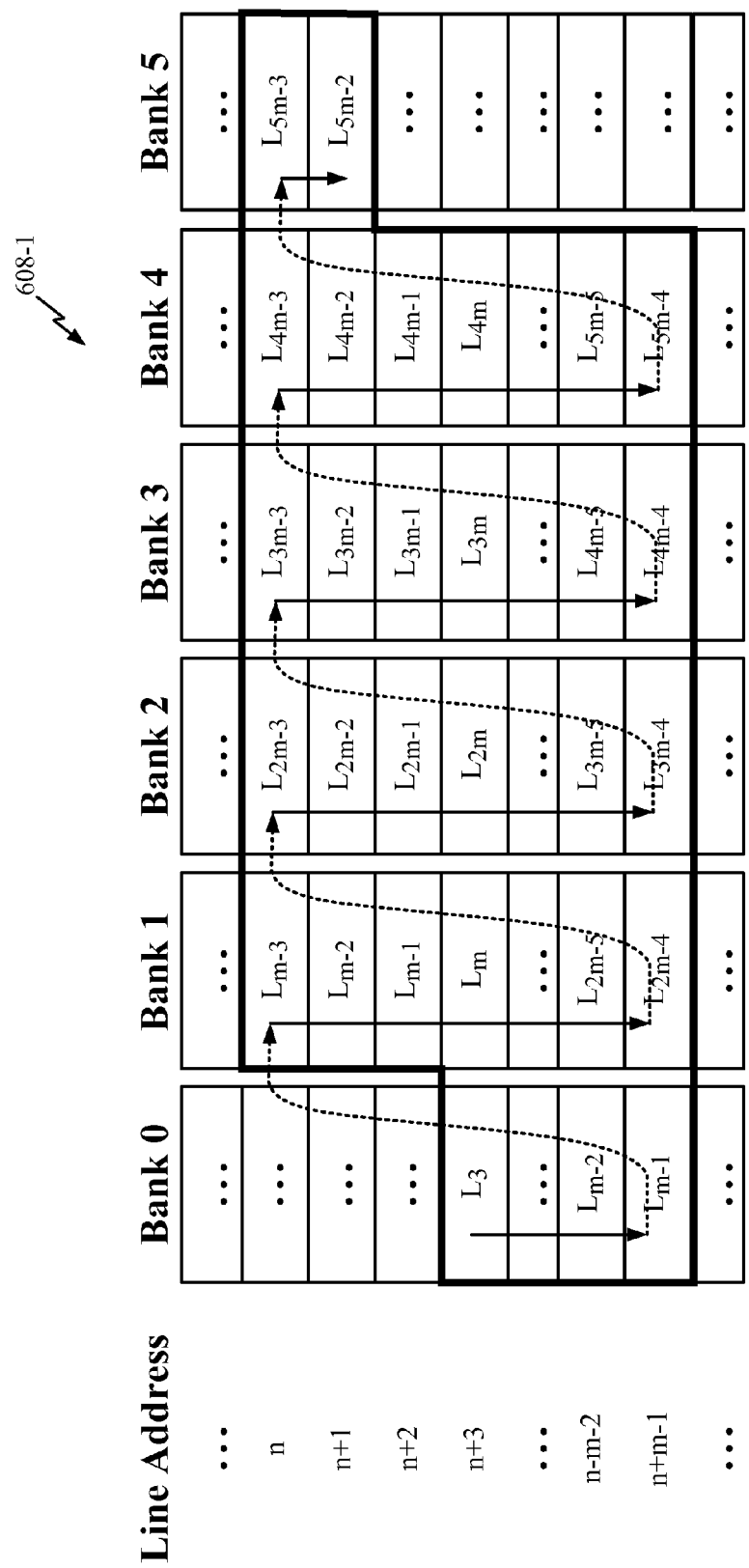
Figure 19:
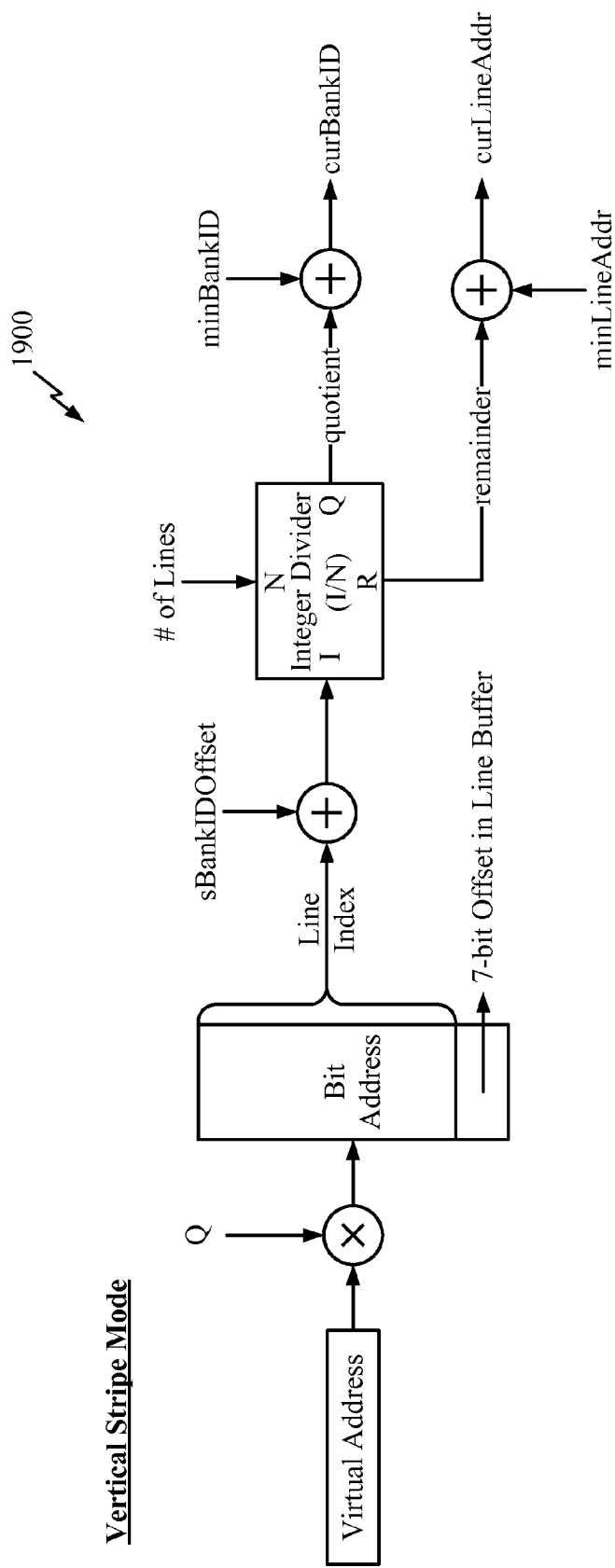
FIG. 19 is a schematic block diagram illustrating example virtual to physical address logic associated with vertical striping of data that may be implemented in a virtual buffer interface capability and/or a memory pool interface capability, in accordance with an implementation.

FIG. 18A-B, for example, show example vertical striping 608-1 and FIG. 19 shows an example translation process 1900 for use in translating between virtual and physical addresses associated with such example vertical striping.

Figure 20:
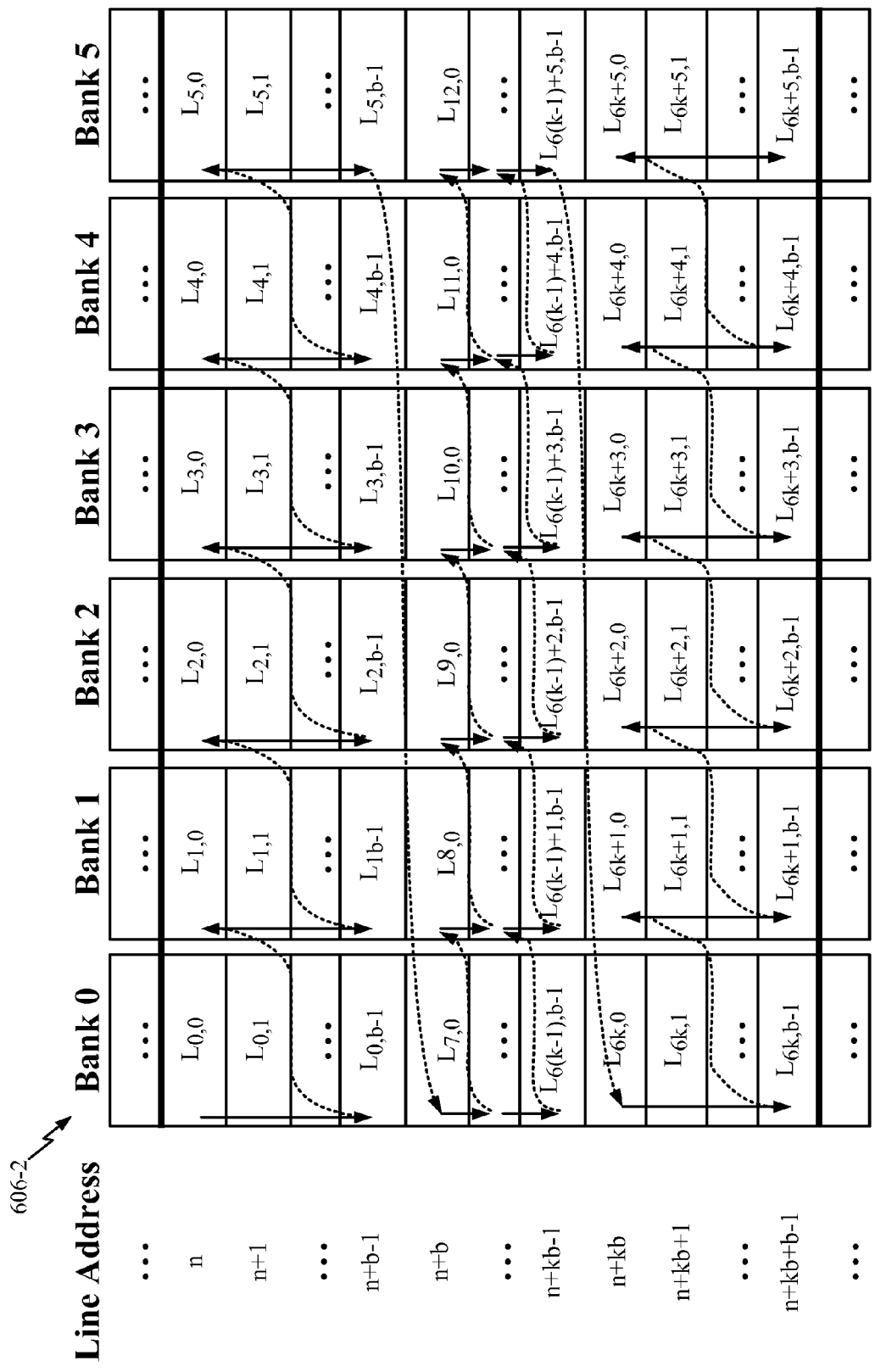
FIG. 20 is a schematic block diagram illustrating an example block horizontal striping of data that may be implemented in a memory pool interface capability, in accordance with an implementation.
Figure 21:
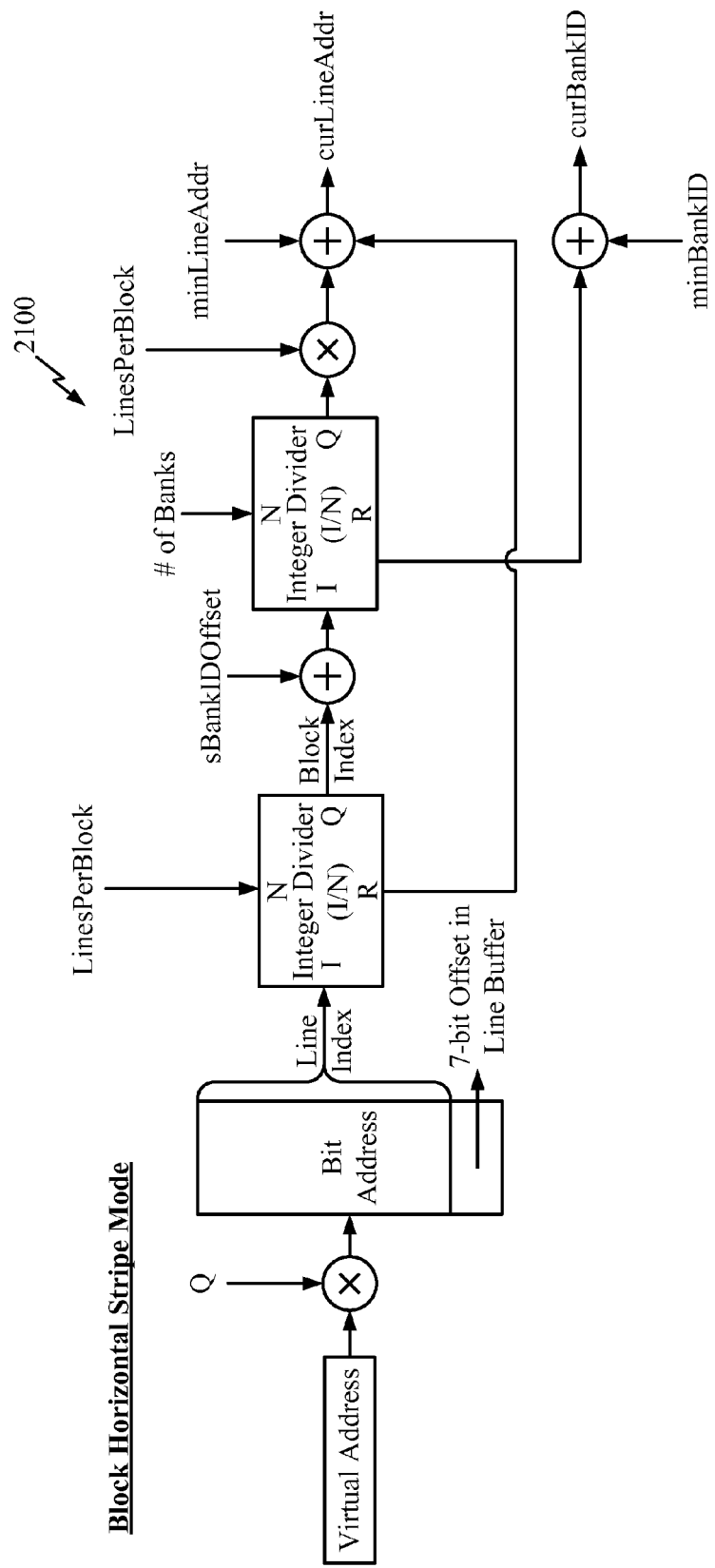
FIG. 21 is a schematic block diagram illustrating example virtual to physical address logic associated with block horizontal striping of data that may be implemented in a virtual buffer interface capability and/or a memory pool interface capability, in accordance with an implementation.

FIG. 20, for example, shows example block horizontal striping 606-2 and FIG. 21 shows an example translation process 2100 for use in translating between virtual and physical addresses associated with such example block horizontal striping.

In the example horizontal striping mode, an access order of line address may be horizontally increased across a range of bank ID. In the example vertical striping mode, a progressing order of line address may be vertical in the given bank. Once a line address in a given bank reaches a boundary of a virtual buffer allocation, then a line address restarts from a minimum value of line address with increasing of a bank ID by one, for example.

In the example block horizontal striping mode, an order of access may be a mixture of horizontal and vertical striping modes. That is, for example, a progressing order of line address in a given block may be vertical while an access order of blocks may be horizontal across a range of bank ID.

Thus, for example, to define a physical memory space for a virtual buffer allocation, one or more of the following parameters and/or the like may be useful: a starting physical address, e.g., comprising or otherwise identifying a bank ID (sBankID) and line address (sLineAddr); an ending physical address, e.g., comprising or otherwise identifying a bank ID (eBankID) and line address (eLineAddr); a range of bank ID, e.g., comprising or otherwise identifying minimum and maximum bank ID (minBankID and maxBankID); a range of line address, e.g., comprising or otherwise identifying minimum and maximum line address (minLineAddr and maxLineAddr); and/or the like.

As illustrated in the examples of FIGS. 17, 19 and 21, conversion of a virtual address to a physical address may be based, at least in part, on equations for computing a corresponding line address (curLineAddr), bank ID (curBankID) and the offset (e.g., here in 128-bit data) (curOffset) from a given virtual address (VA) by, for an example horizontal stripe mode:

$$curLineAddr = minLineAddr + \{sBankID + (VA \times Q)/128\}/numBanks$$

$$curBankID = minBankID + \{sBankID + (VA \times Q)/128\}/numBanks$$

$$curOffset = (VA \times Q)/128$$

Similarly, for an example vertical stripe mode:

$$curLineAddr = minLineAddr + \{sLineAddr + (VA \times Q)/128\}/numLines$$

$$curBankID = minBankID + \{sLineAddr + (VA \times Q)/128\}/numLines$$

$$curOffset = (VA \times Q)/128$$

Also similarly, for an example block horizontal stripe mode:

$$curLineAddr = minLineAddr + \{(VA \times Q)/128\}/BlockSize + [\{(VA \times Q)/128\}/BlockSize + sBankID]/numBanks \times BlockSize$$

$$curBankID = minBankID + [\{(VA \times Q)/128\}/BlockSize + sBankID]/numBanks$$

$$curOffset = (VA \times Q) \% 128$$

In the examples above, the numBanks, numLines, and BlockSize represents the total number of banks, 128-bit lines, and the number of Q-bit data per block, respectively. The size of the virtual buffer allocation may be not necessarily same as the size of physical memory space configured by above parameters, for example, because the last data for the virtual buffer may be not always aligned at the boundary of 128-bit line data. Therefore, the size of the virtual buffer allocation may be equal to or less than an actual size of physical memory space for the virtual buffer.

In accordance with some of the previous example implementations, a memory pool interface capability may, for example, take the form of an apparatus having a memory pool comprising a plurality of individually accessible memory banks. Such an apparatus may comprise an arbitration layer to selectively access the memory pool on behalf of a plurality of client processes, wherein at least two of the memory banks are concurrently accessible via the arbitration layer and are capable of storing data therein within at least a portion of a multidimensional data structure. Here, for example, a multidimensional data structure may comprise a plurality of columns and a plurality of rows and may be operatively arranged using some form of horizontal striping and/or vertical striping of data. An arbitration layer may be capable of selectively accessing some of the data in at least one portion of said multidimensional data structure on behalf of a first client process/engines (and/or virtual buffer interface supporting such) by at least one row, and selectively accessing some data in said at least one portion of the multidimensional data structure on behalf of a second client process/engine (and/or virtual buffer interface supporting such) by at least one column.

In certain example implementations, as described herein, at least one offset value associated with the horizontal striping and/or vertical striping of data may be used to access/arrange the multidimensional data structure.

With attention drawn back now to FIG. 1A-C, apparatus 100 may, for example, be enabled for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), Advanced LTE, WiMAX, Ultra Mobile Broadband (UMB), and/or the like.

Processing unit(s) and/or other like logic circuitry may be implemented in hardware or a combination of hardware and software. Processing unit(s) and/or other like logic circuitry may be representative of one or more circuits configurable to perform at least a portion of a data computing procedure or process. By way of example but not limitation, processing unit(s) may include one or more processors, controllers, microprocessors, microcontrollers, application specific integrated circuits, digital signal processors, programmable logic devices, field programmable gate arrays, various logic circuitry and the like, or any combination thereof.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

The methodologies described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating,", "identifying", "determining", "establishing", "obtaining", "maintaining", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method comprising:
in a wireless modem:
accessing task information from at least one of a plurality of task queues, wherein one or more of a plurality of shared client processes is configured to process the task information;
selectively altering a portion of the task information to generate altered task information based on event information associated with at least one of the plurality of task queues, wherein altering the portion of the task information includes discontinuing execution of at least one task thread associated with at least one of the plurality of task queues; and
selectively routing the altered task information to at least one of the plurality of shared client processes.

2. The method as recited in claim 1, further comprising:
obtaining the event information associated with at least one of the plurality of task queues.

3. The method as recited in claim 1, further comprising:
obtaining, at least in part via a pulling operation, at least a portion of the at least one task thread from a memory.

4. The method as recited in claim 1, further comprising:
storing at least a portion of the at least one task thread in a first-in, first-out (FIFO) buffer.

5. The method as recited in claim 4, further comprising:
selectively altering at least the portion of the at least one task thread stored in the FIFO buffer.

6. The method as recited in claim 4, wherein selectively altering the portion of the task information further comprises:
operatively bypassing the portion of the at least one task thread stored in the FIFO buffer.

7. The method as recited in claim 6, wherein selectively altering the portion of the task information further comprises:
storing the portion of the altered task information in the FIFO buffer.

8. The method as recited in claim 1, further comprising:
selectively altering the portion of the task information based, at least in part, on at least one identifier within the at least one task thread.

9. The method as recited in claim 1, further comprising:
selectively altering the portion of the task information based, at least in part, on at least one conditional determination.

10. The method as recited in claim 1, further comprising:
arbitrating access to the at least one of the plurality of shared client processes between at least two of the plurality of task queues.

11. An apparatus comprising:
a processor;
a resource authority to selectively route task information to one or more of a plurality of shared client processes;
a task queue array comprising a plurality of task queues to provide the task information to the resource authority for routing to the one or more of the plurality of shared client processes; and
at least one task decoder coupled to at least one of the plurality of task queues, wherein the at least one task decoder is configured to selectively alter a portion of the task information to generate altered task information based on event information associated with at least one of the plurality of task queues, wherein altering the portion of the task information includes discontinuing execution of at least one task thread associated with at least one of the plurality of task queues.

12. The apparatus as recited in claim 11, further comprising:
an event pool coupled to the plurality of task queues,
wherein the event pool is configured to provide access to the event information associated with at least one of the plurality of task queues.

13. The apparatus as recited in claim 11, wherein at least one of the plurality of task queues comprises a task fetcher to obtain at least a portion of the at least one task thread.

14. The apparatus as recited in claim 11, wherein at least one of the plurality of task queues comprises a task buffer to store at least a portion of the at least one task thread.

15. The apparatus as recited in claim 14, wherein the at least one task decoder selectively alters at least the portion of the at least one task thread stored in the task buffer.

16. The apparatus as recited in claim 14, wherein the at least one task decoder operatively bypasses at least the portion of the at least one task thread stored in the task buffer.

17. The apparatus as recited in claim 16, wherein at least one of the plurality of task queues comprises a task dispatcher coupled to the at least one task decoder to selectively provide the altered portion of the task information to the resource authority.

18. The apparatus as recited in claim 11, wherein the at least one task decoder is configured to selectively alter the portion of the task information based, at least in part, on at least one identifier within the at least one task thread.

19. The apparatus as recited in claim 12, wherein the at least one task decoder is configured to obtain the event information and to selectively alter the portion of the task information based, at least in part, on the event information.

20. The apparatus as recited in claim 11, wherein the at least one task decoder is configured to selectively alter the portion of the task information based, at least in part, on at least one conditional determination.

21. An apparatus for use in a wireless modem, the apparatus comprising:
  means for accessing task information from at least one of a plurality of task queues, wherein one or more of a plurality of shared client processes is configured to process the task information;
  means for selectively altering a portion of the task information to generate altered task information based on event information associated with at least one of the plurality of task queues, wherein altering the portion of the task information includes discontinuing execution of at least one task thread associated with at least one of the plurality of task queues; and
  means for selectively routing the altered task information to at least one of the plurality of shared client processes.

22. The apparatus as recited in claim 21, further comprising:
  means for obtaining event information associated with at least one of the plurality of task queues.

23. The apparatus as recited in claim 21, further comprising:
  means for obtaining, at least in part via a pulling operation, at least a portion of the at least one task thread from a memory.

24. The apparatus as recited in claim 21, further comprising:
  means for storing at least a portion of the at least one task thread in a first-in, first-out (FIFO) manner.

25. The apparatus as recited in claim 24, further comprising:
  means for selectively altering at least the portion of the at least one task thread stored in the FIFO manner.

26. The apparatus as recited in claim 24, further comprising:
  means for operatively bypassing the portion of the at least one task thread stored in the FIFO manner.

27. The apparatus as recited in claim 26, further comprising:
  means for storing the portion of the altered task information in the FIFO manner.

28. The apparatus as recited in claim 21, further comprising:
  means for selectively altering the portion of the task information based, at least in part, on at least one identifier within the at least one task thread.

29. The apparatus as recited in claim 21, further comprising:
  means for selectively altering the portion of the task information based, at least in part, on at least one conditional determination.

30. The apparatus as recited in claim 21, further comprising:
  means for arbitrating access to the at least one of the plurality of shared client processes between at least two of the plurality of task queues.

31. An article comprising:
  a non-transitory computer-readable medium having stored thereon computer-implementable instructions executable by at least one processing unit in a wireless modem to:
    access task information from at least one of a plurality of task queues, wherein one or more of a plurality of shared client processes is configured to process the task information;
    selectively alter a portion of task information to generate altered task information based on event information associated with at least one of the plurality of task queues, wherein altering the portion of the task information includes discontinuing execution of at least one task thread associated with at least one of the plurality of task queues; and
    initiate selectively routing of the altered task information to at least one of the plurality of shared client processes.

32. The article as recited in claim 31, the computer-implementable instructions being further executable by the at least one processing unit to:
  obtain event information associated with at least one of the plurality of task queues.

33. The article as recited in claim 31, the computer-implementable instructions being further executable by the at least one processing unit to:
  obtain, at least in part via a pulling operation, at least a portion of the at least one task thread from a memory.

34. The article as recited in claim 31, the computer-implementable instructions being further executable by the at least one processing unit to:
  initiate storing of at least a portion of the at least one task thread in a first-in, first-out (FIFO) buffer.

35. The article as recited in claim 34, the computer-implementable instructions being further executable by the at least one processing unit to:
  selectively alter at least the portion of the at least one task thread stored in the FIFO buffer.

36. The article as recited in claim 34, the computer-implementable instructions being further executable by the at least one processing unit to:
  initiate operatively bypassing the portion of the at least one task thread stored in the FIFO buffer.

37. The article as recited in claim 36, the computer-implementable instructions being further executable by the at least one processing unit to:
  initiate storing of the portion of the altered task information in the FIFO buffer.

38. The article as recited in claim 31, the computer-implementable instructions being further executable by the at least one processing unit to:
  selectively alter the portion of the task information based, at least in part, on at least one identifier within the at least one task thread.

39. The article as recited in claim 31, the computer-implementable instructions being further executable by the at least one processing unit to:
  selectively alter the portion of the task information based, at least in part, on at least one conditional determination.

40. The article as recited in claim 31, the computer-implementable instructions being further executable by at least one processing unit to:
  initiate arbitrating access to the at least one of the plurality of shared client processes between at least two of the plurality of task queues.

* * * * *